US006859821B1

(12) United States Patent
Ozzie et al.

(10) Patent No.: US 6,859,821 B1
(45) Date of Patent: Feb. 22, 2005

(54) METHOD AND APPARATUS FOR PRIORITIZING DATA CHANGE REQUESTS AND MAINTAINING DATA CONSISTENCY IN A DISTRIBUTED COMPUTER SYSTEM EQUIPPED FOR ACTIVITY-BASED COLLABORATION

(75) Inventors: Jack E. Ozzie, Chester, NH (US); Raymond E. Ozzie, Manchester, MA (US)

(73) Assignee: Groove Networks, Inc., Beverly, MA (US)

( * ) Notice: Subject to any disclaimer, the term of this patent is extended or adjusted under 35 U.S.C. 154(b) by 0 days.

(21) Appl. No.: 09/356,148

(22) Filed: Jul. 19, 1999

(51) Int. Cl.$^7$ .............................................. G06F 15/16
(52) U.S. Cl. ...................... 709/205; 709/201; 709/213; 707/201; 715/511
(58) Field of Search ............................... 707/201, 202, 707/203; 709/201, 205, 213, 204, 203, 248, 249; 715/511

(56) References Cited

U.S. PATENT DOCUMENTS

| | | | | |
|---|---|---|---|---|
| 5,008,853 A | * | 4/1991 | Bly et al. ..................... 345/2.1 |
| 5,170,480 A | * | 12/1992 | Mohan et al. ............... 707/201 |
| 5,392,400 A | * | 2/1995 | Berkowitz et al. ........... 709/106 |
| 5,434,994 A | * | 7/1995 | Shaheen et al. ............. 709/223 |
| 5,446,842 A | | 8/1995 | Schaeffer et al. |
| 5,538,255 A | | 7/1996 | Barker |
| 5,555,404 A | * | 9/1996 | Torbj.o slashed.rnsen et al. .......................... 707/202 |
| 5,765,171 A | * | 6/1998 | Gehani et al. ............... 707/203 |
| 5,787,262 A | * | 7/1998 | Shakib et al. ................ 709/205 |
| 5,802,322 A | * | 9/1998 | Niblett ........................ 709/219 |
| 5,806,075 A | * | 9/1998 | Jain et al. .................... 707/201 |
| 5,892,949 A | | 4/1999 | Noble |
| 5,899,810 A | * | 5/1999 | Smith .......................... 463/42 |
| 6,119,147 A | * | 9/2000 | Toomey et al. .............. 709/204 |
| 6,199,116 B1 | * | 3/2001 | May et al. ................... 709/204 |
| 6,301,589 B1 | * | 10/2001 | Hirashima et al. ........... 707/204 |
| 6,321,252 B1 | * | 11/2001 | Bhola et al. ................. 345/753 |
| 6,449,622 B1 | * | 9/2002 | LaRue et al. ................ 707/201 |
| 6,571,278 B1 | * | 5/2003 | Negishi et al. .............. 709/213 |

FOREIGN PATENT DOCUMENTS

| | | |
|---|---|---|
| EP | 0 891 064 A | 1/1999 |
| GB | 2 303 946 A | 3/1997 |
| WO | WO 97 36406 A | 10/1997 |
| WO | WO 98/38594 A1 | 9/1998 |

OTHER PUBLICATIONS

E.Berglund and DR.Cheriton. Amaze: a multiplayer□□computer game.IEEE Software. 2(3):30–39, May 1985.*

Berglund, et al.; Amaze: A Multiplayer Computer Game; IEEE Software; May 2, 1985; p. 30–39; New York, New York.

(List continued on next page.)

*Primary Examiner*—Frantz B. Jean
*Assistant Examiner*—Anita Choudhary
(74) *Attorney, Agent, or Firm*—Kudirka & Jobse, LLP

(57) ABSTRACT

A distributed, activity-based collaboration system can employ a data change request priority scheme for determining an order of execution of data change requests in effecting changes to local copies of data so as to optimize data consistency for collaborative activities. The data change request priority scheme can entail encoding sequence number information and dependency information in the data change requests, responsive to which data changes can be made, unmade and remade to the data.

33 Claims, 13 Drawing Sheets

OTHER PUBLICATIONS

Koch, Michael, "Design Issues and Model for a Distributed Multi–User Editor", Computer Supported Cooperative Work, 1995, 359–378, vol. 3, Kluwer Academic Publishers, Boston, MA.

Sun, Chengzheng, et al., "Achieving Convergence, Causality–Preservation, and Intention–Preservation in Real–time Cooperative Editing Systems", ACM Transactions on Computer–Human Interaction, Mar. 1998, pp. 2–42, vol. 5, No. 1.

Begole, James "Bo", "Flexible Collaboration Transparency", Department of Comuter Science, Virginia Tech, May 12, 1997, p. 1–30, Internet address http://simon.cs.vt.edu/~begolej/Papers/Prelim/FlexibleCollabTrans.pdfO.

Yang, Y., et al., "A Web–Based Synchronous Cooperative Editor for Software Development", ICSE–98 Workshop on Software Engineering over Internet address www3.cm.deakin.edu.au/~yun/ICSE–W98/editor/index.htm, 1998.

* cited by examiner

METHOD AND APPARATUS FOR PRIORITIZING DATA CHANGE REQUESTS AND MAINTAINING DATA CONSISTENCY IN A DISTRIBUTED COMPUTER SYSTEM EQUIPPED FOR ACTIVITY-BASED COLLABORATION

CROSS REFERENCE TO RELATED APPLICATIONS

The following co-pending, commonly-assigned U.S. patent applications are related to the present application, and incorporated by reference herein in their entirety:

Ser. No. 09/356,930, entitled "Method and Apparatus for Activity-Based Collaboration by a Computer System Equipped with a Dynamics Manager," filed on even date herewith by Raymond E. Ozzie and Jack E. Ozzie, now U.S. Pat. No. 6,446,113 B1.

Ser. No. 09/357,007, entitled "Method and Apparatus for Activity-Based Collaboration by a Computer System Equipped with a Communications Manager", filed on even date herewith by Raymond E. Ozzie, et al.

FIELD OF THE INVENTION

The invention relates generally to computers interconnected for communication over a network such as the Internet, and more particularly to a distributed computer-based system for coordinating and otherwise maintaining data pursuant to a distributed data model.

BACKGROUND OF THE INVENTION

The Internet has established a dynamic, public environment for communication and interaction among its millions of users. In business, the Internet has redefined vendor-manufacturer, manufacturer-distributor, distributor-customer, and other relationships. With extension of the Internet technology into internal, secured networks of individual companies, the "intranet" or "private Internet", as it is called, has enabled new forms of document and information sharing between individual employees and work groups using company directory and network infrastructure. On-line services, such as electronic bulletin boards and chat rooms, electronic commerce, and technical support for products, are available on the World Wide Web ("WWW" or "Web") operating over the Internet.

The Internet has, at its core, a server-client architecture, in which individual clients (i.e., Internet-content users) interface via computer-executable applications such as browsers with servers (i.e., Internet-content providers) to obtain documents from Web sites. Browsers are software programs that enable personal computers to request, receive (e.g., download), interpret, and present Internet documents, and generally navigate the Internet. Web servers typically have standard interfaces for running external programs, the most common is the Common Gateway Interface (CGI). Web sites are collections of documents, usually consisting of a home page and related, linked documents, located on servers remote from the client. The documents can be compound documents, containing data, graphics, video, sound, and/or other types of media, as well as links to other documents. Essentially, the WWW is a web of interconnected documents, or, more precisely, document objects that are located at various sites on the Internet.

Among the types of document objects on the WWW are documents and scripts. A script is an executable program, or a set of commands stored in a file, that can be run by a Web server to produce a document that is then returned to the Web browser. Typical script actions include running library routines or other applications to get information from a file or database, or initiating a request to get information from another computer, or retrieving a document corresponding to a selected hypertext link. A script is run on the Web server when, for example, a user selects a particular hypertext link in the Web browser.

Underlying the Internet technology are advances in standardization, including personal computer hardware, software, network protocols, and infrastructural conventions (such as the "Uniform Resource Locator" or "URL"). URLs provide location addresses for all document objects on the WWW. A URL uniquely references a document object and often defines an access algorithm using Internet protocols.

"Internet protocols", as that expression is used herein, are defined as current or future language conventions and present or future communication protocols that are generally-accepted and used for generating messages including documents for transmission over the Internet, or for transmitting such messages over the Internet, respectively. Such language conventions include, for example, at present, Hypertext Markup Language ("HTML") and extensible Markup Language ("XML"). Such communication protocols include, for example, at present, Hypertext Transfer Protocol ("HTTP"), TCP/IP, FTP and GOPHER. Those skilled in the art will be familiar with these language conventions and protocols.

HTML is a language used for writing hypertext documents, containing multimedia content and links to other documents. An HTML document includes a hierarchical set of markup elements, where most elements have a start tag, followed by content, followed by an end tag. Tags are enclosed in angle brackets ("<" and ">") and indicate how the document is structured and how to display the document, as well as destinations and labels for hypertext links. There are tags for markup elements such as titles, headers, text attributes such as bold and italic, lists, paragraph boundaries, external links to other documents, and internal links to other parts of the same document, graphic images, and many other document features. Many books are in wide circulation regarding programming using HTML.

XML is another of the language conventions included in the Internet protocols. XML is compatible with and complementary to HTML, at least in its current version. It is a standard way of describing a class of data objects as stored in computers, called XML documents, and behavior of programs that process these objects. XML documents are made up of storage units called entities, which contain either text or binary data. Text is made up of characters, some of which form the character content of the documents, and some of which form markup. Markup encodes a description of the document, such as its storage layout and logical structure. A software module called an XML processor is used to read XML documents and provide access to their content and structure. Further information regarding XML can be had with reference to Version 1.0 of the XML specification, available at <HTTP://www.w3.org/XML>, and incorporated herein by reference.

A Web server and a Web browser communicate typically using the HTTP message protocol and the underlying TCP/IP data transport protocol of the Internet. In HTTP, the Web browser establishes a connection to a Web server and sends an HTTP request message to the server. In response to the request message, the Web server checks authorization, performs any requested action such as downloading a document identified by its URL, and returns an HTTP response message containing either the HTML document resulting from the requested action or an error message. The returned document may simply be a static file stored on the Web server, or it may be generated dynamically using a script called in response to the request message.

To take advantage of the Internet, tools and resources have been developed in compliance with the Internet protocols, including company-critical applications such as e-mail. E-mail is electronic mail, by means of which documents are sent and received electronically at selected addresses. It has been estimated that a vast majority of Internet-based interaction is through the use of e-mail and other browser-based media that follow a "document send and receive" model. Perhaps due to that model, users often view the Internet as inherently "peer-to-peer", with individuals accessing in documents provided by other individuals, without intervention by a higher authority.

The Internet is dynamic and flexible in providing users with entertaining and useful ways of communicating, though it does not meet all the needs of users. While users interact increasingly through the Internet, they continue to interact "off" of the Internet in more conventional ways, such as through multi-medium (phone, fax, whiteboard), multi-temporal (real-time, overnight mail) and other informal means of communication.

It would be desirable to extend the Internet paradigm to personal and private communications and other shared and mutual activities between individuals and small groups in shared private spaces. Such interactions should preferably occur instantly, directly, and confidentially between participants' personal computers, or other network-capable devices, without exposing such interactions to server bottlenecks through which Internet traffic is typically funneled to third-party Web sites where communications can be intercepted and confidences violated.

It would also be desirable to provide a technique that allows users at various remote sites to share and edit documents on a peer-to-peer basis, while maintaining consistent copies of the documents at local sites. Such a technique should permit any of the users to issue change requests regarding the documents, which changes can then be made asynchronously to the copies at all the local sites in a coordinated fashion even if the sites are disconnected from the network when the change requests are issued. The technique should provide a high level of data consistency across all the sites so that each site presents essentially the same document for viewing and/or editing by the various, geographically dispersed users.

SUMMARY OF THE INVENTION

The invention resides in an apparatus called an activity, which is operable in a personal computer system, communication appliance or other network-capable device, for performing a shared, focused task with other, remotely-located users, such as, for example, a "chat", gaming, or business application. The activity includes a tool for generating data change requests, called deltas, responsive to user interactions. The activity also has a data-change engine for maintaining data in preferably non-volatile, persistent memory pursuant to a data model. The data-change engine includes a tool end for receiving deltas from the tool, providing the deltas with activity-specific commands for carrying out the request, and providing notification to the tool of data changes caused by delta execution. The data-change engine also includes a dynamics manager end for receiving, from a dynamics manager, data-change directions to execute the deltas, i.e., perform the deltas' commands to make the requested changes to the data.

In another aspect, the invention resides in a system for providing communications and other shared and mutual activities between individuals and small groups in shared private spaces, called "telespaces". In the system, participants or members of a telespace interact through network-capable devices, which can communicate with one-another over a network, e.g., the Internet and store individually local copies of telespace data. Each telespace is an instantiation of one or more activities operable on each of the network-capable devices of members of the telespace. Each activity includes one or more tools for initiating data change requests or deltas responsive to telespace member interactions. Each activity also includes one or more data-change engines, separate from the tools, for maintaining the local copy of telespace data pursuant to a common data model. The data model is, for example, activity-specific, and preferably telespace-wide. Each network-capable device also includes a dynamics manager, responsive to the deltas, for directing the data-change engine to execute the deltas by making the requested changes to the local copy of data, and for coordinating the execution of the deltas from the various network-capable devices.

In yet another aspect, the invention can be practiced in a networked system including plural, preferably network-capable devices at different locations connected for communication preferably in accordance with Internet protocols. Each network-capable device has (a) a memory for storing a local copy of activity-related data pursuant to a common data model, (b) one or more activities each including one or more tools and corresponding data-change engines as described above, (c) a communications manager for causing deltas to be shared among all the network-capable devices of the networked system that participate in the telespace to which the deltas pertain; and (d) a dynamics manager for coordinating execution of both locally-generated and remotely-generated deltas. The user interactions can be initiated, and the resulting deltas generated, at any of the network-capable devices of the networked system, and the deltas are transmitted to each of the devices preferably over the network. The dynamics managers direct the operation of their local data-change engines, preferably to prioritize execution of deltas and to maintain substantial consistency of the data across the networked system. The networked system thus allows users at various remote sites, e.g., to share and edit data or perform other activities independently, on a peer-to-peer basis, while maintaining substantially consistent copies of the data at each of the network-capable devices for use even when disconnected from the network.

In still another aspect, the invention can be implemented as an activity-based collaboration (ABC) system for interpersonal interaction. The ABC system includes plural, network-capable devices connectable, e.g., via public networks (e.g., the Internet or wide area networks (WANs)) or via private networks (e.g., local area networks (LANs) or intranets), by cable, fiberoptics, infrared (IR) or other forms of communication links, to form the above-described networked system. Each network-capable device is equipped with the above-described memory, and a framework including one or more dynamics managers. The network-capable devices are preferably plug-compatible with the public network infrastructure, personal desktop applications and infrastructure (sometimes called "personal Internets"), and, where applicable, a company intranet. The ABC system preferably uses dynamic, snap-in activity components, each for performing a specific task, such as "chat", document editing, gaming, etc. The activity components can comprise software made available, for example, as shrink-wrapped products or downloaded over the network, e.g., the Internet. The activity components can operate through common application programming interfaces (API) with the framework. Accordingly, the framework can be viewed and function as a platform for applications in the form of the activity components.

Yet another aspect of the invention resides in a distributed technique for maintaining a high level of data consistency across the ABC system. In each peer unit, a dynamics manager implements a data change request priority scheme that determines an order for executing the data change requests to promote data consistency. In an exemplary embodiment of the data change request priority scheme, each data change request has (and preferably contains) request sequence number information and dependency information. The dynamics manager can cause the appropriate engine to make, roll-back ("undo"), and remake ("redo") data changes in response to this information. The dependency information can specify, for example, a single prior data change request, in which case the dynamics manager will ensure that the prior data change request has indeed been processed at the corresponding peer unit prior to processing the data change request that depended on that prior request. In case of a dependency collision between data change requests depending on the same prior request, a dependency collision resolution scheme can be employed. For example, priority can be awarded based on date or sponsor of telespace membership, characteristic of the endpoint (such as job title, work group or department), nature or document location of the change requested, or other considerations.

Thus, the invention can be implemented as separate commercial products and services, including provision of the individual activity components, the framework for individual network-capable devices, and/or networked or ABC system, as well as communication services for effecting interactions between devices forming the system.

BRIEF DESCRIPTION OF THE DRAWINGS

The above and further advantages of the invention may be better understood by referring to the following description in conjunction with the accompanying drawings in which.

DETAILED DESCRIPTION OF THE PREFERRED EMBODIMENT

A. Terminology

Figure 1:
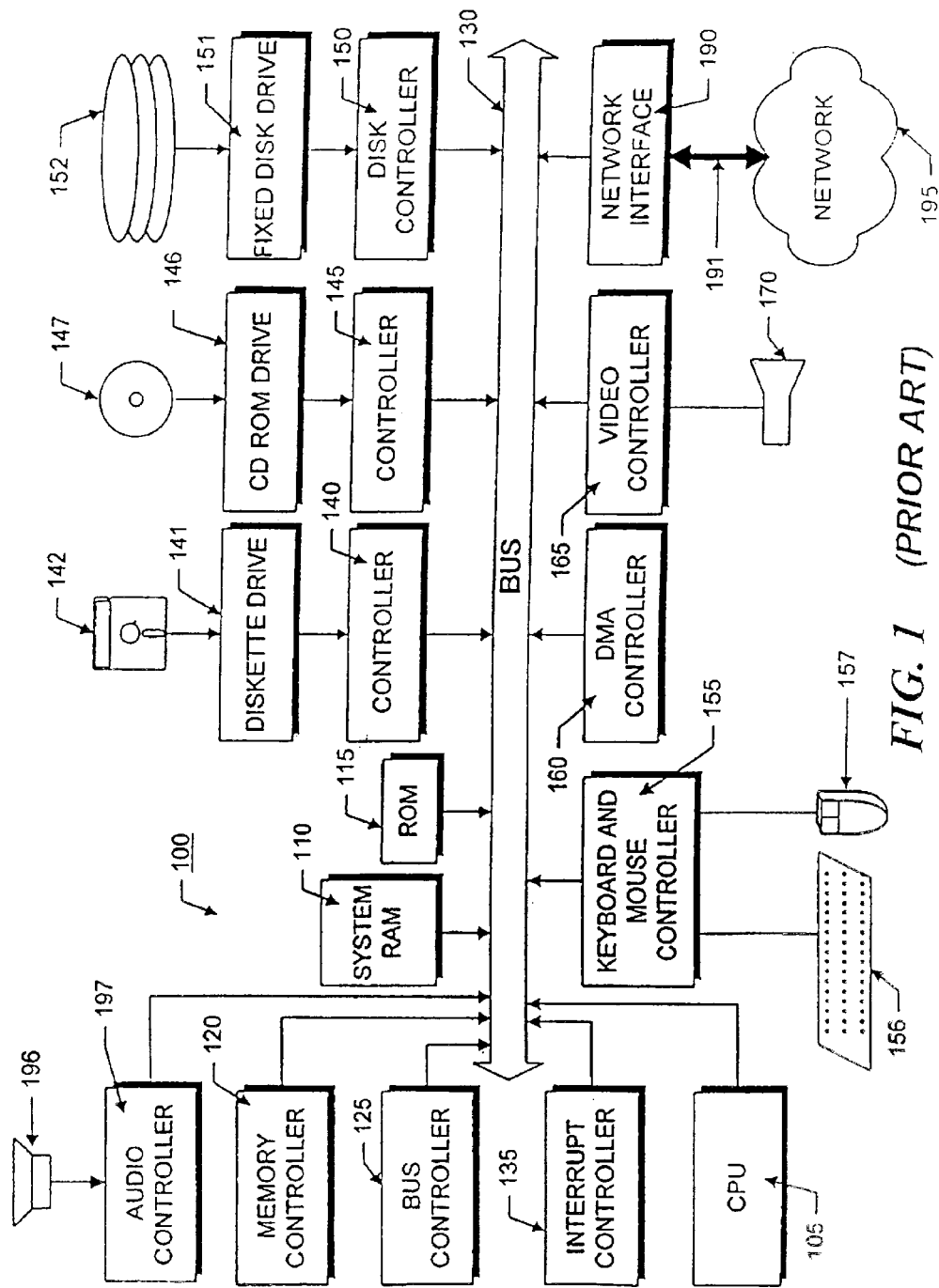
FIG. 1 is a block diagram of an illustrative architecture of a conventional computer system.

It may prove useful to introduce at the outset certain terminology and abbreviations used in this specification, including: activity, client, communications manager, component, controller, delta, device, dynamics manager, engine, framework, identity, member, navigation, person, server, telespace, tool, URL, and XML.

"Activity" refers to what a user actually does with the ABC system in order to interact with other users. The term "activity" can have either of two meanings, depending on context. From an "outside view," it means a runtime interaction between the ABC system and a computer user; e.g., an activity of this type permits users to draw on a shared whiteboard or permits two or more users to chat in real-time. An activity in this sense can also be a background service (i.e., agent) running on a user's behalf on a local or server device, such as an archive server agent, or an inbound FAX agent. From an "inside view" of a software designer, "activity" means a modular, computer-executable program that can run on a user's personal computer or other form of device and perform a focused task. An activity in this sense is comprised of two types of components, a tool and an engine, which are combined at design time to create an "activity template". An activity template can be distributed in many ways, for example as shrink-wrapped software or as software that can be downloaded off the Web. It is envisioned that widely-distributed programs used for word-processing, spreadsheets, etc. will have versions designed for use in the ABC system, and sold as such in activity template form conforming to ABC system programmer interfaces.

"Client" refers to a user's personal computer, communication appliance or other form of device that is capable of human interaction, and connectable to a network, e.g., the Internet. Background programs that run on the user's personal computer are called "Client Service Controllers". Foreground user interface (UI) programs that run on the user's personal computer are called "Client UI Controllers".

"Communications Manager" refers to a mechanism for directing inbound and outbound deltas to appropriate destinations. The communications manager can be implemented, for example, as a computer-executable program, which directs locally-initiated deltas created by a tool/engine pair for transmission over a network, e.g., the Internet, to another remote personal computer or other form of network-capable device, or to a relay when that remote device is not connected to the network; and which directs remotely-generated deltas received over a network, e.g., Internet, to a dynamics manager.

"Component" refers to a computer-executable program and its resources used within an activity. All components are identified by URLs. It is envisioned that the Web can be a global repository for components, with versions securely downloadable onto an appropriate component platform in the ABC system.

"Computer" refers to a device, as that term is defined hereinbelow.

"Controller" refers to a top-level, computer-executable program that drives the "inner" functionality of the ABC system. A controller is tuned for a given platform, for example, a UNIX™ Daemon controller, or a controller for Microsoft Windows™ running on an Intel™ microprocessor-based computer system. Two general types of controllers are a service controller, which runs as a background process generally invisible to users, and a user interface (UI) controller, which is interactively controlled by a user.

"Delta" refers to a self-contained unit of data that contains one or more tool-to-engine data change requests (i.e., notifications or prompts regarding desired changes to the data). Tools initiate delta creation by the dynamics manager in response to user interaction, and submit them to engines for asynchronous execution, as described below, under the direction of a dynamics manager. A delta has a specific format, including a header portion for providing control information and a payload portion for providing information regarding the data to which the request pertains. An individual delta can have one or more payloads, and where multiple payloads are employed, each can be targeted to telespace members with unique device capabilities or user roles. Tools request information regarding potential data changes from engines for display or other form of presentation to users, and are asynchronously notified when deltas cause display changes.

"Device" refers to a physical hardware device, such as a personal computer (pc) or communication appliance, which, for purposes hereof, unless the context indicates otherwise, is typically network-capable, i.e., can communicate with other network-capable devices over the network, e.g. the Internet using Internet protocols. All devices are assigned a unique identity code by the ABC system, have URLs, and are distinct from the persons using the devices. A device potentially hosts many telespaces. A device can be, for example, a pc, cellular telephone, fax machine, hand-held organizer, cable TV set top box, electronic entertainment unit (such as electronic toys and games and stereo equipment, or any other such network capable appliance, equipment or product).

"Dynamics manager" refers to the part of the framework of the ABC system, which facilitates the creation and coordinates the execution of deltas. The dynamics manager can be implemented, for example, as a computer-executable program that runs on a user's personal computer or other form of network-capable device.

"Endpoint" refers to a unique pairing of a device and a person. The ABC system uses this concept as a method of uniquely-distinguishing a person among multiple users of a device, or devices among multiple computers used by the same person.

"Engine" refers to what can be called the "bottom half" of an activity that implements the management and modification of persistent storage and data structures within the ABC system. Engines are packaged as components, have no user interfaces themselves but rather depend on their corresponding tools for user interfaces, and are substantially portable. Engines preferably exist exclusively to serve their corresponding tools. Engines preferably operate in universal synchrony.

"Framework" refers to the "inner workings" of the ABC system and contains most of its subsystems, including the dynamics manager, but no user interface. The framework is a computer-executable program that can run on a user's personal computer or other form of network-capable device, and sits logically between the high-level controllers and the activities.

"Identity" is generally synonymous with "person", though generally refers to one of the names, represented by an URL, by which a person is known by others. This concept comes into play because the ABC system embraces the notion that a person may have many identities or aliases, and, for example, many different URLs.

"Member" refers to a participant within or subscriber to a telespace, and is generally synonymous with the person portion (as opposed to device portion) of an endpoint when referring to telespace membership.

"Navigation" refers to the act of moving between URLs, and is analogous in the ABC system to navigation between Web pages and sites by a Web browser.

"Person" refers to a human being, or a server acting as a human's proxy, and generally refers to one who is participating in activities within a telespace. Each person has one or more identities, each of which is uniquely identified with an URL.

"Server" refers to a device that is normally incapable of direct human interaction except over a communications channel and can only run as background programs under service controllers.

"Telespace" refers to a virtual place were people gather to participate in one or more activities, and where people share things. The telespace and the results of activities are persistently stored in memories on users' personal computers or other forms of network-capable devices. A telespace is generally kept in synchrony between a user's device and other peoples' devices. A telespace represents the logical unit of "membership" and access to activities. A telespace is an instantiation of one or more activities.

"Tool" refers to what can be called the "top half" of an activity that implements the activity's user interfaces. Tools are packaged as components, initiate delta creation in response to user gestures, and interact with corresponding engines of the individual activities to perform specific tasks.

"URL" is an abbreviation for universal resource locator, which is an unique structured address of a resource such as a document, and, in some instances, represents a method by which a resource should be handled. URLs are used herein for substantially all persistent objects, user-visible objects, and external program-visible objects.

"XML", as noted above, is an abbreviation for eXtended Markup Language, which is a standard, structured data format derivative of SGML intended for use on the Web. Depending on the context it also refers to an in-memory object structure used in the ABC system, which is compliant with the XML standard's semantics. Many XML concepts are used herein, such as "documents", "elements", "tags", "attributes", "values", "content", "entities", "links", and "pointers". XML is used herein, for example, for structuring data in a document.

B. Conventional Computer System

FIG. 1 illustrates a conventional system architecture for an exemplary computer system 100, with which the disclosed invention can be implemented. The exemplary computer system of FIG. 1 is discussed only for descriptive purposes, however, and should not be considered a limitation of the invention. The invention is further not limited to devices traditionally thought of as computer systems, since it may be implemented in any of various types of network-capable devices, including, e.g., video game consoles, personal appliances or cable set-top boxes. Although the description below may refer to terms commonly used in describing particular computer systems, the described concepts apply equally to other computer systems, including systems having architectures that are dissimilar to that shown in FIG. 1. For example, cable set-top boxes may not contain mass storage but do contain video tuners built with digital signal processors.

The computer system 100 includes a central processing unit (CPU) 105, which may include a conventional microprocessor, random access memory (RAM) 110 for temporary storage of information, and read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components.

Mass storage may be provided by diskette 142, CD-ROM 147, or hard disk 152. Data and software may be exchanged with client computer 100 via removable media, such as diskette 142 and CD-ROM 147. Diskette 142 is insertable into diskette drive 141, which is connected to bus 130 by controller 140. Similarly, CD-ROM 147 is insertable into CD-ROM drive 146, which is connected to bus 130 by controller 145. Finally, the hard disk 152 is part of a fixed disk drive 151, which is connected to bus 130 by controller 150.

User input to the computer system 100 may be provided by a number of devices. For example, a keyboard 156 and a mouse 157 may be connected to bus 130 by keyboard and mouse controller 155. An audio transducer 196, which may act as both a microphone and a speaker, is connected to bus 130 by audio controller 197. It should be obvious to those reasonably skilled in the art that other input devices, such as a pen and/or tablet and a microphone for voice input, may be connected to client computer 100 through bus 130 and an appropriate controller. DMA controller 160 is provided for performing direct memory access to system RAM 110. A visual display is generated by a video controller 165, which controls video display 170.

Computer system 100 also includes a network adapter 190 that allows the client computer 100 to be interconnected to a network 195 via a bus 191. The network 195, which may be a local area network (LAN), a Wide area network (WAN), or the Internet, may utilize general-purpose communication lines that interconnect multiple network devices.

Computer system 100 generally is controlled and coordinated by operating system software. Among other computer system control functions, the operating system controls allocation of system resources and performs tasks such as process scheduling, memory management, networking and I/O services.

C. Conventional Approach to Controlling a Data Model

Figure 2:
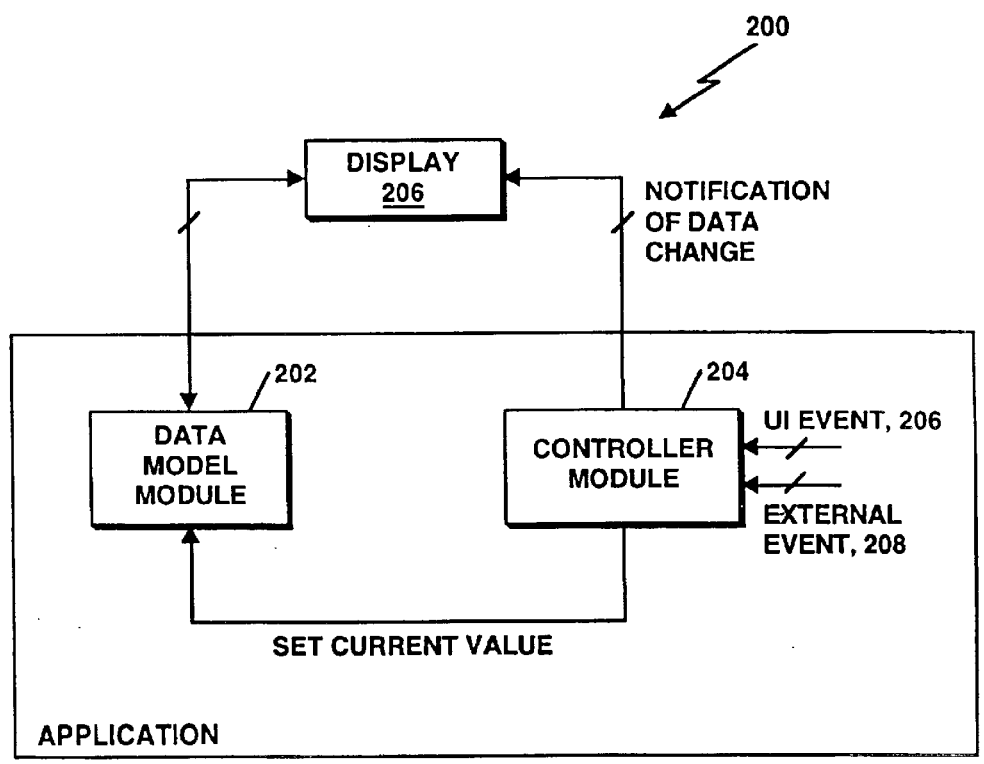
FIG. 2 is a block diagram of a conventional application run on the computer system of FIG. 1, in which a control module is responsible for both interfacing with a display or other user interface and for maintaining data in accordance with a data model.

FIG. 2 shows a conventional system 200 for controlling a data model using a technique known as "model view controller". In system 200, a data model module 202 stores and maintains data, for example a database, in accordance with a data model. A controller module 204, responsive to a locally initiated event 206 (such as a user input) or to an externally initiated event 208 (such as event notifications received from remote computer systems), directs a "set current value" command to the data model module 202 to cause a change in the stored data. The controller module 204 notifies an output device such as display 206 of the data change. The display 206 obtains the changed data from the data model module 202 and updates the display of the data so that the current data can be viewed by a user. The foregoing technique is strictly event driven and linear in operation. Typically, internal or external events that cause the controller module 204 to command a change to the data are stored in a FIFO (first-in, first-out) buffer in the controller module 204, and then handled in the order in which the event notification reaches the controller module. Typically, also, no provision is made in system 200 for global consistency issues, that is, for assuring that copies of the model data in the system 200 are consistent with data in other remote systems.

The conventional approach for controlling a data model as exemplified in the system 200 was appropriate in an age in which computer systems, whether mainframes or personal computers, operated in relative isolation. With the advent of the Internet, computer users demand improved ways of collaborating, and the invention provides what can be called "model mediated control", in which a dynamics manager mediates changes effected by the data-change engine to the data model.

D. Internet Paradigm for Intercomputer Operation

Figure 3:
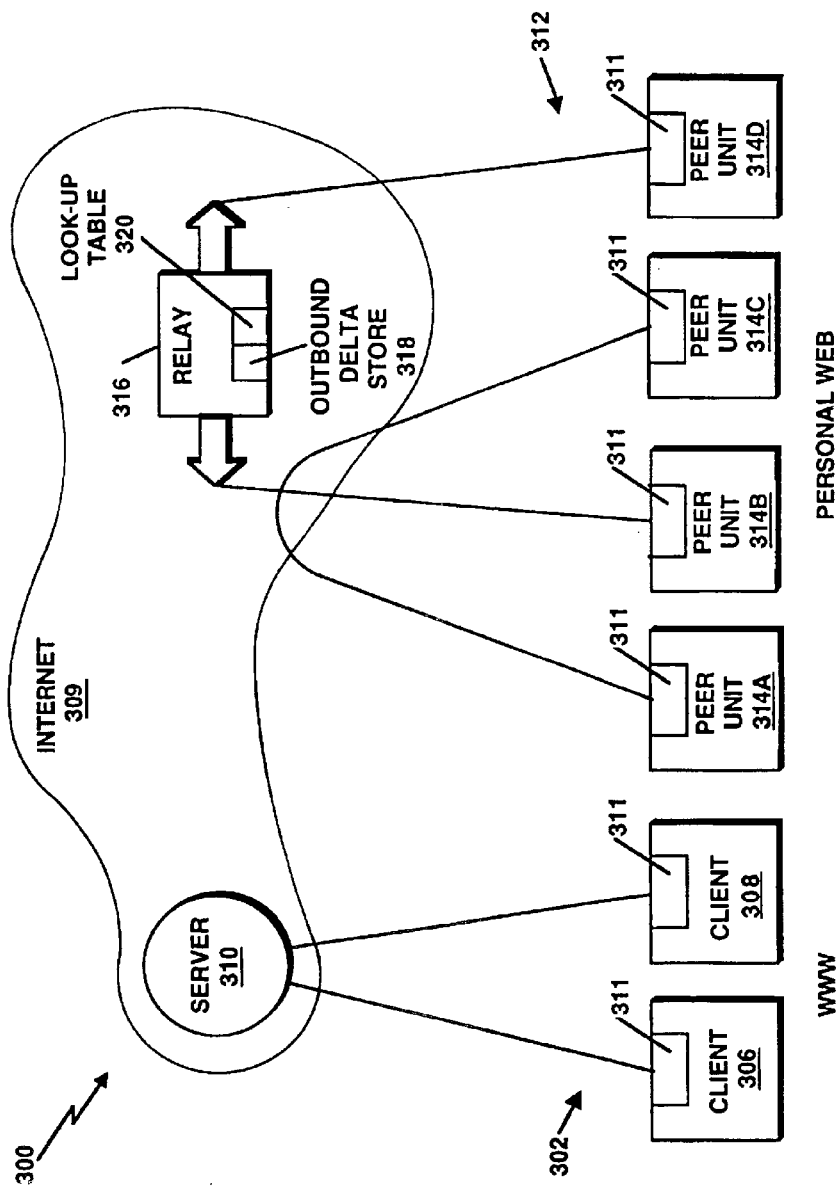
FIG. 3 is a block diagram of an Internet-based system, showing both a client-server system for the WWW and a peer-to-peer system for a personal Web in accordance with an embodiment of the invention.

FIG. 3 illustrates an Internet environment 300, in which the present invention can be advantageously employed. From the perspective of a user, in a conventional client-server view 302, individual clients 306, 308 separately communicate over the Internet 309 with a server 310. Each client 306, 308 can direct a request through the Internet 309 to the server, and, responsively, the server 310 may respond to the request, for example, by providing documents stored on the server over the Internet 309 to the clients. Each server 310 and client 306, 308 can be implemented as a personal computer as illustrated in FIG. 1 (with certain UI components optional in the case of the server), capable of execution of appropriate programs such as a client browser 311 and/or other communication interface, as described below. In a peer-to-peer view 312 of Internet use, the users' computer systems constitute peer units 314A–D, and communications through the Internet can be directed from one peer unit to another, without apparent intermediaries. Each peer unit 314A–D can be implemented as a personal computer such as that illustrated in FIG. 1 or other form of network-capable device. The invention can be implemented advantageously in either clients 306, 308, or peer units, 314A–D, though that description will focus on implementation with a peer-to-peer view of the system.

As will be explained in more detail below, such peer-to-peer communications can be made directly or via a relay device 316. The relay device 316 is preferably a "store and forward", which can store messages destined to a peer unit 314 which is temporarily disconnected from the Internet, and later, on reconnection, can forward the messages to that peer unit.

E. ABC system Architecture and Operation

Figure 4:
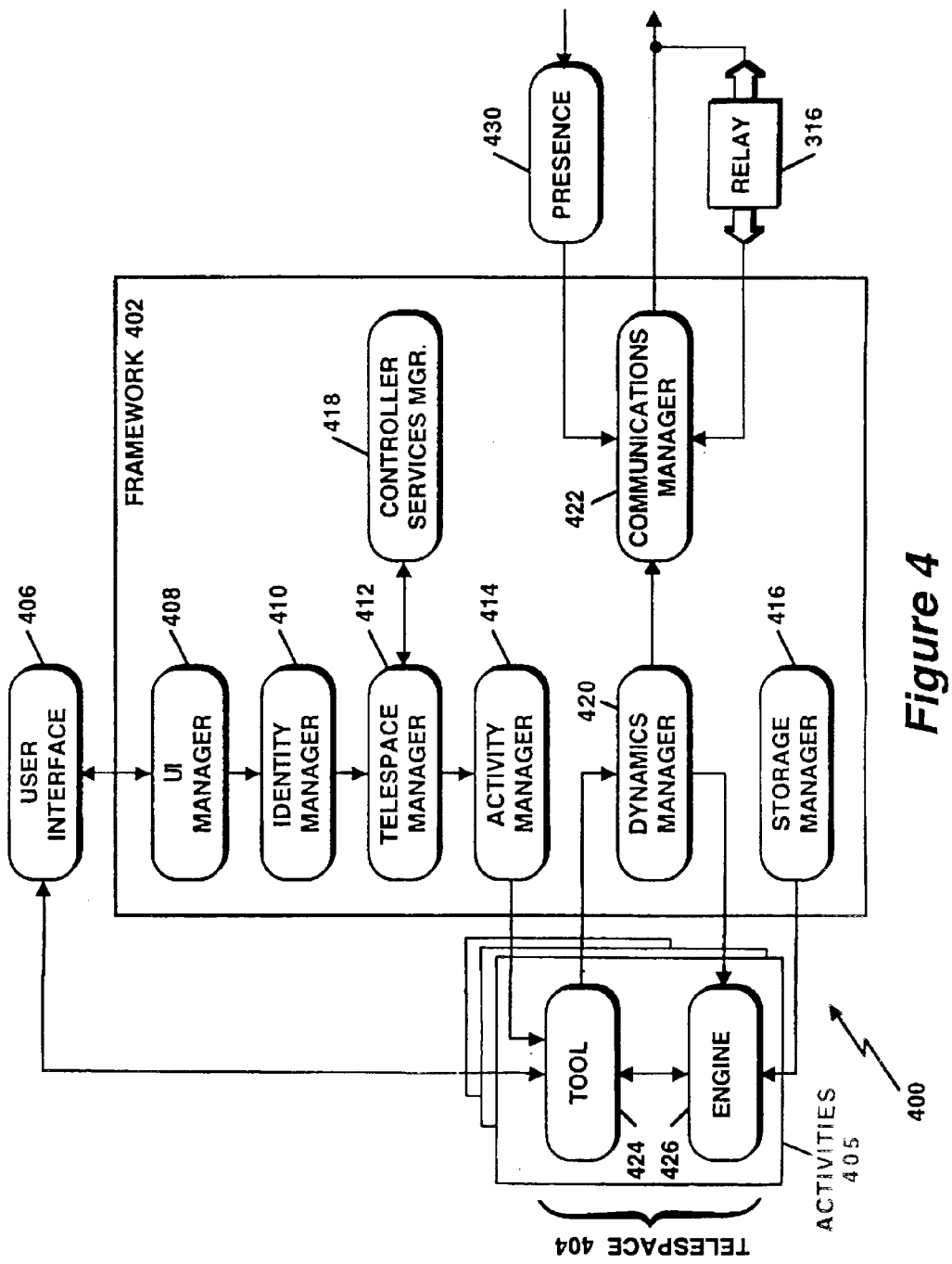
FIG. 4 is a block diagram of a portion of ABC system as implemented on the computer system of FIG. 1 in accordance with an embodiment of the invention.

FIG. 4 shows the ABC system 400 as implemented on one of the peer units 314A–D, such as, for example, peer unit 314A. The ABC system on peer unit 314A has framework 402, at least one telespace 404, and a user interface 406. The framework 402 preferably provides a platform for servicing a number of telespaces 404. The framework 402 preferably is of modular construction, with a programmer interface on which the activities run and through which they communicate with framework components.

The framework 402 includes a user interface manager 408, identity manager 410, telespace manager 412, activity manager 414, storage manager 416, controller services manager 418, dynamics manager 420, and communications manager 422.

The user interface (UI) manager 408 is responsible for managing shared services for a number of user interface controllers (not separately shown). The UI manager 408 manages layout of activities within panes of a display window, and otherwise provides a desired "look and feel" for the user interface. The UI manager 408 also manages activity navigation (for example, go to, next, previous, etc.) and maintains a navigation history.

The identity manager 410 is responsible for maintaining identities of a telespace's member. As noted above, an identity is the name, and corresponding URL, by which each user is known by others. Individual users may have one or many identities. The identity manager 410 maintains a record or table, preferably in XML, of the identities. The identity manager 410 can also maintain a record or table, preferable in XML, of the URL's of telespace members and their corresponding device URL's. Alternatively, a separate member manager can be implemented.

The telespace manager 412 is responsible for managing each of the telespaces 404 that may be opened on the peer unit 314A. Each telespace 404 is an instantiation of one or more activities. Each telespace 404 has a corresponding activity manager 414.

The activity manager 414 is responsible for (a) adding new activities to a telespace, (b) opening existing activities in a telespace, and (c) updating telespace activities from new activity template versions. To add a new activity, the activity manager 414 is provided with the URL of an activity template, opens the template, and extracts and propagates the template information (such as component URLs) into the telespace. The template defines the initial activity configuration for a telespace. A user may add additional activities to the telespace 404 later as needed. After being added, an activity is "part of" the telespace and visible to all telespace members. A telespace has a tag to identify its activity manager and bind the activity manager and data. Preferably, each document has a local registry linked to it, with XML tag names maintained in the registry to express mapping (reference pointers or associations) in an extensible, platform-independent way, between the document and its corresponding telespace. Each telespace member has a framework and an activity template for the telespace available on his or her peer unit 314A–D.

Each activity includes a tool, such as tool 424 and an engine, such as engine 426. The tool 424 provides the user interface (UI) capability for the activity, interacting via UI 406 with a member. UI interaction may include UI events initiated, for example, via the keyboard 156 (FIG. 1) or mouse 157 (FIG. 1). In response to such UI events, the tool 424 may request its corresponding engine 426 to effect data model changes, subscribing to the engine 426 for asynchronous data change notifications for updating UIs asynchronously when data changes occur. A tool 424 also implements application program interfaces (APIs) for interacting with background services provided under the direction of the controller manager 418. The engine 426 is responsible for maintaining and changing the data that supports the telespace 404 and/or results from user interaction obtained through the tool. The engine 426 can modify persistent model data, and emit asynchronous data change notifications to the tool 424, both under the direction and control of the dynamics manager 420, as will be explained below. The storage manager 416 controls access to the stored data.

For creation of an activity template, a software developer may write or adapt a tool and engine for use within the framework. An activity template is a persistent representation of the tool and engine components comprising an activity. An activity template can be distributed, for example, as shrink wrapped software or downloaded, for example, over the Internet to peer unit 314A from a remote server. Activity components can be regarded as Web documents and are represented persistently via URLs. The activity template itself preferably has a URL, which allows for tracking activity design changes. The activity template can be a single activity template or an activity collection template. A single activity template pertains to only one activity, such as "chat". An activity collection template pertains to a collection of activities, such as "chat and outline".

For use, the ABC system 400 gets a member's identity via the identity manager 410, opens a telespace manager, requests the telespace manager to open a telespace via a URL, requests the telespace manager for an activity manager, and, then, the activity manager opens an activity, typically by using the activity's URL. Then, the ABC system 400 is ready for members to use the telespace to perform the shared, focused tasks offered by the particular activity.

Figure 5:
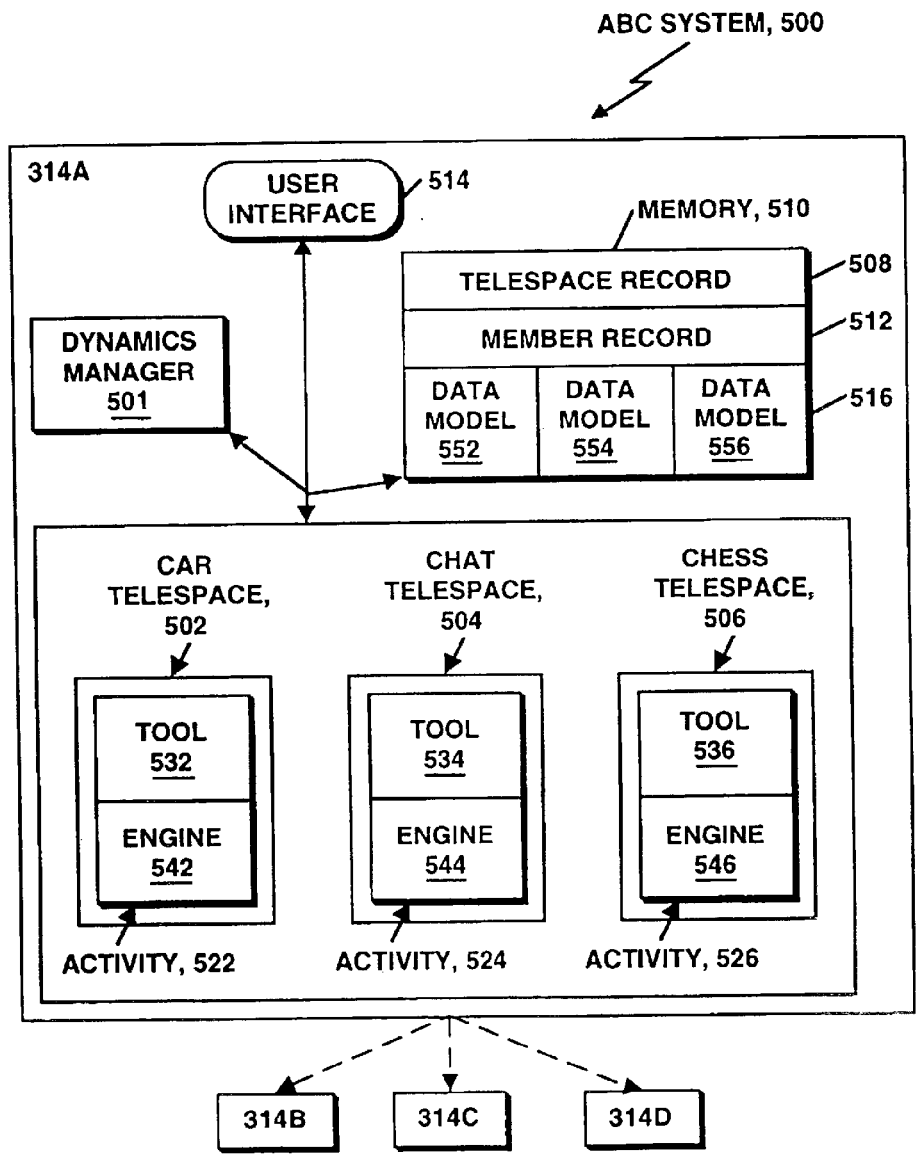
FIG. 5 is a block diagram of a portion of ABC system as implemented on the computer system of FIG. 1, and illustrating typical telespace applications in accordance with an embodiment of the invention.

FIG. 5 shows an exemplary, multi-telespace use of an ABC system 500 on peer units 314A–D. It should be understood that the ABC system 500 is a distributed system. As such, while a description is provided of components only of peer unit 314A, peer units 314B–D have analogous components, and no separate description of them is necessary.

As shown for peer unit 314A, the ABC system 500 includes a number of illustrative telespaces in which peer unit 314A is subscribed as a member, including a car designing telespace 502, a chat telespace 504, and a chess playing telespace 506. As also shown, peer unit 314 has a number of components used during operation of the telespaces 502, 504, 506. Peer unit 314A has a memory 510 that maintains a telespace record 508, which lists and describes each of the telespaces 502, 504, 506 in which it is member, and a member record 512, which lists and describes each of the identities of telespace members that may participate in those telespaces. A UI 512 can receive user-initiated changes to the telespace and member records 508, 514.

Each of the telespaces 502, 504, 506 instantiates a different one of the illustrated activities 522, 524, 526. (Alternatively, the illustrated activites 522, 524, 526 could reside in a single telespace, in which case all members of the single telespace would have access to each of the activities.) Each activity 522, 524, 526 includes a respective tool 532, 534, 536 specific to the activity, and under control of a respective engine 542, 544, 546 for carrying out changes to a corresponding data model 552, 554, 556 contained in memory 510, and which is persisted in each of the telespaces 502, 504, 506. For example, the car design telespace 502 is an instance of an activity 522 that can include a tool 532 in the form of CAD (computer-aided design) software, and the chess-playing telespace 506 is an instance of an activity 526 that can include a tool 536 in the form of a software chess game.

Users pursue the activities 522, 524, 526 of the telespaces 502, 504, 506, via the user interface 514, which interfaces with the tools 532, 534, 536 for providing the tools with user requests. Responsive to the requests, the engines 542, 544, 546 change the persistent state of a corresponding data model 552, 554, 556 in memory 510, under the control of the dynamics manager 501 to reflect a current state. For example, the persistent state of the data for the chess-playing telespace 506 might include a chess board and locations of the chess pieces on the board; a user request may specify a chess piece move, which constitutes a change in the data, i.e., a delta; and the current state would reflect the execution of the delta and the consummation of the move.

Figure 6:
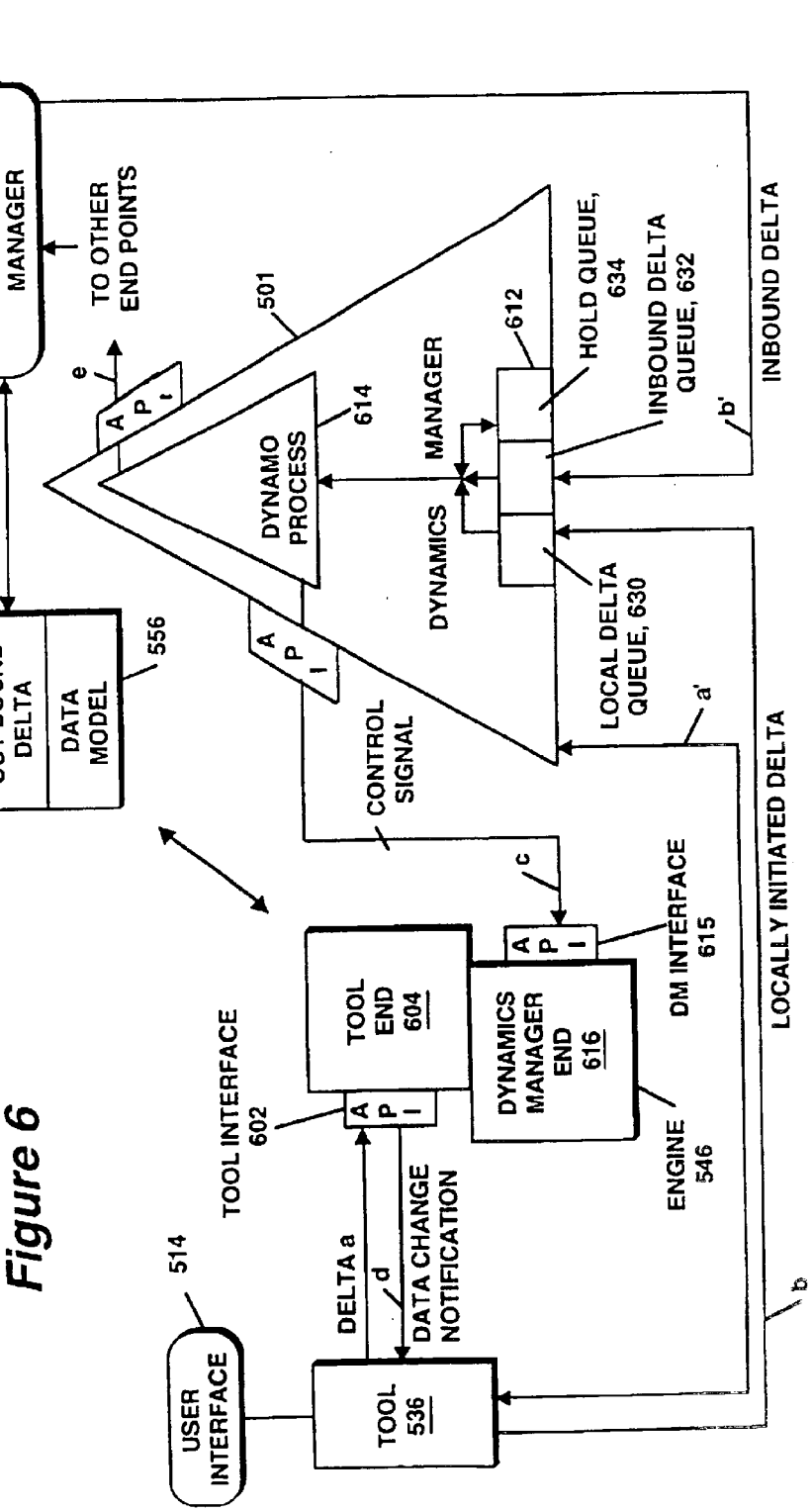
FIG. 6 is a block diagram of a portion of the ABC system as implemented for the chess telespace of FIG. 5.

FIG. 6 illustrates the operation of the ABC system 500, with reference to components thereof located in the peer unit 314A and described with respect to FIG. 5. The engine 546 presents to the tool 536 potential actions or options (e.g., chess piece moves) that can be implemented in furtherance of the particular focused task of the activity 526. The tool 536 interacts with a user who is a member of telespace 506 (as recorded in the member record 512) through the user interface 514, presenting a view of the activity (e.g., a view of the chessboard, and, possibly, a list of moves). In response to a user input, called a user gesture, (e.g., move BISHOP from X to Y) entered via the user interface 514, the tool 536 records a user selection in memory by causing a delta to be generated and stored in the system. A delta is a unit of requested change, preferably, in the form of a container object. Container objects are well known by those familiar with object-oriented programming techniques. The tool 536 is responsible for determining the granularity of the change requested in the delta. The delta container object can hold (contain) one or more commands for carrying out the change, in addition to user-specified data, e.g., an identification of a particular chess piece and the original and target locations on the board constituting a move of that chess piece. Upon generation, the delta is empty of any commands, and itself constitutes merely a request for change until filled with the appropriate commands by the engine 546 to effectuate the change. It is the responsibility of the engine 546 to record in the delta in an engine-specific way (which need not be known to the tool 536) the commands required to effect the change.

More specifically, as indicated by line "a'", the tool 536 initiates creation of a delta by requesting its generation by the dynamics manager 501. The dynamics manager 501 creates the delta and returns it over line a' to the tool 536, and may record the created delta in case fault recovery is required.

As indicated at line "a" of FIG. 6, the tool 536 passes control of the delta through a tool interface 602 to a tool-end 604 of the engine 546, thereby invoking the engine. (This description shall from time to time state that deltas are passed or that control to deltas shall pass from one component to another. Preferably, the deltas are objects allocated in memory whose pointer is passed as XML elements.) The engine's tool interface 602 exposes a set of application programming interfaces for creating commands that can effectuate the requested change encoded in the delta, or, in other words, for filling a delta with appropriate, typically engine-specific commands in serial form to fulfill the user's intent. The engine 546 then passes control of the delta, now filled with the commands, back to the tool 536.

As indicated at line "b" of FIG. 6, the tool 536 passes control of (i.e., submits) the filled delta to the dynamics manager 501 for execution. The dynamics manager 501 may also receive inbound deltas over line "b" from other peer units 314B–D. The dynamics manager 501, along with the dynamics managers in peer units 314B–D, are responsible for maintaining consistency of executed changes to the data model 556 from one end of the ABC system to the other for all members who participate in the chess game telespace.

The dynamics manager 501 includes queue structures 612 and a dynamo process 614, preferably a computer-executable program containing the main logic of the dynamics manager. The dynamics manager 501, and its dynamo process 614, are in bi-directional communication with the communications manager 622. The dynamics manager 501 enqueues the received deltas in the queue structures 612 for ordering purposes, then the dynamo process 614 services the queue structure in processing the enqueued deltas, and directing the engine 546 to execute them in an appropriate order. More specifically, the dynamo process 614 of dynamics manager 501 sends a control signal in the form of a "delta command execution" message through the interface 615 to the dynamics manager end 616 of the engine 546 over line "c" of FIG. 6. The delta command execution message directs the engine 546 to proceed with execution of the delta received from the tool 536 by making the requested change to the data model 556 contained in the memory 510, and which is persisted in the telespace.

The dynamo process 614 of dynamics manager 501 also disseminates all locally-initiated deltas to other endpoints via the communications manager 622, which transmits them over the network, e.g., 626 to the peer units 314B–D. At each peer unit 314B–D, the respective dynamics manager enqueues received deltas in its local queue structures, and then passes them in a specified order to its respective engine for execution.

A single dynamics manager can support a single telespace or multiple telespaces, depending on the application, and thus can be responsible for directing a number of engines to execute deltas for the various telespaces. In systems having multiple telespaces, as illustrated in FIG. 5, the dynamics manager 501 determines which engine should execute a delta by examining the delta's information. The delta contains commands that are identified to a specific one of the engines, and tagged with an engine identifier or code carried in the delta's payload. When the enqueued delta is processed by the dynamics manager, the dynamics manager associates the engine code with the referenced delta, and directs the delta's execution by the appropriate engine.

Finally, as indicated at line "d" of FIG. 6, the engine 546 sends a "data change notification" message to notify the tool 536 of the execution of the delta, and of a new current state of the data in the data model 556. The data change notification can be made by value or reference. That is, the notification can include the new data values themselves or can include a pointer to the new data in memory. In response to the notification, the tool 536 causes the user interface 514 to make the change available to the user, e.g., by displaying the move on a chess board graphic. If a user is viewing the display 170 (FIG. 1), the user will be able to see the change to the chess game caused by execution of the delta; otherwise, the change is effected to the data in memory 510 without the user "seeing" the change at the time it is made.

Preferably, at substantially the same time that the change is being made by engine 546 to the data model 556 stored in memory 556 of peer unit 314A, the other peer units 314B–D are making the analogous change to their locally stored data so as to effect the intent of the delta in a consistent manner. Situations may arise where one or another of the peer units 314A–D is not connected to the network, e.g., the Internet. Where the peer unit 314A may be disconnected, the communications manager 622 employs a device presence detector 430 to ascertain whether the peer unit 314A is connected and, if not, stores outbound deltas in an outbound delta store 628 until such time as connection is restored, and then transmits the stored deltas. Where one or more destination peer units 314B–D are disconnected from the network, the communications manager 622 of peer unit 314A can proceed to transmit the outbound delta to relay 316 (FIG. 3) without regard to whether the other peer units are disconnected. The relay 316 (FIG. 3) receives such outbound deltas, stores them as necessary in an outbound delta store 318 (FIG. 3), and forward them upon the destination peer unit 314B–D being reconnected. In operation, the communications manager 622 can send all outbound deltas to the URL of the relay 316, and the relay can utilize an on-board look-up table 320 to ascertain the endpoint URL of the destination peer unit 314B–D to be used for relaying the delta. The relay service can be provided, in practice, by an Internet Service Provider (ISP) or other Internet organizations.

It can be seen that, as between the tool 536 and the engine 546, user interface activities are effected directly only via the tool 536 and data model changes are effected directly only via the engine 546. In the vernacular, the tool 536 "owns" the UI and the engine 546 "owns" the data model. This can be contrasted with current, typical applications as illustrated in FIG. 2. For example, spreadsheet programs today typically combine the functions of the tool and the engine rather than separating them as in the foregoing embodiment of the invention. By separating the tool from the engine, and thus the UI from the data model, the dynamics manager can intervene and mediate between deltas originating from the various peer units, e.g., for purposes of maintaining data consistency. Moreover, separation of the tool from the engine permits the process of execution of deltas to be carried out asynchronously. This is useful because it takes time for the dynamics manager 501 and engine 546 to carry out their responsibilities in a manner, e.g., that will maintain data consistency for all telespace members. It is also useful because inbound deltas from other peer units 314B–D can affect timing of execution of locally-initiated deltas.

Figure 7:
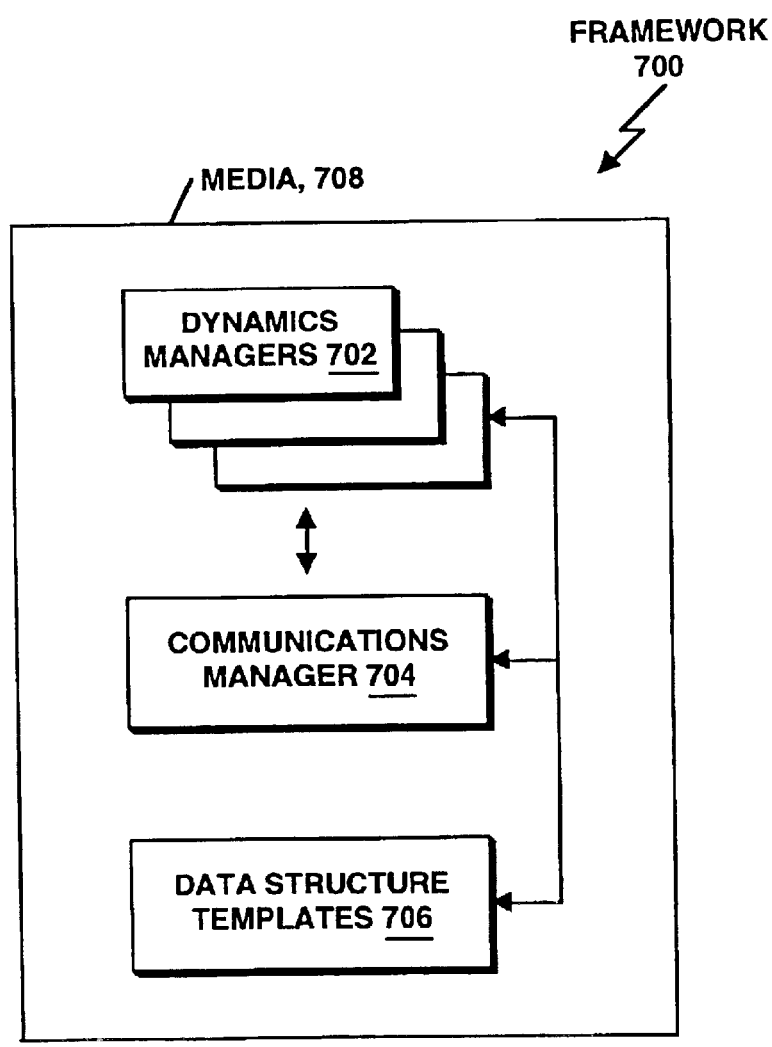
FIG. 7 is a block diagram of a framework 700 including portions of the ABC system of FIG. 4.

FIG. 7 shows an embodiment of a framework 700 for use with separately implemented activities (not shown). A framework can be sold or licensed, e.g., as a computer program product, distinct from individual activities, which may be application specific snap-ins operable over the framework. Generally speaking, the framework hosts collaborations with respect to telespaces. The illustrated framework 700 includes one or more dynamics managers 702, a communications manager 704, and a data structure template 706. The data structure template 706 can contain object primitives, preferably in XML format, for use by activity developers. The framework 700 can be implemented, for example, as computer-readable media 706, on which is stored computer-executable code comprising the dynamics managers 702 and communications manager 704, and computer readable data, including the object primitives of the data structure template 700.

F. Communications manager, Presence Server, and Relay

Figure 8:
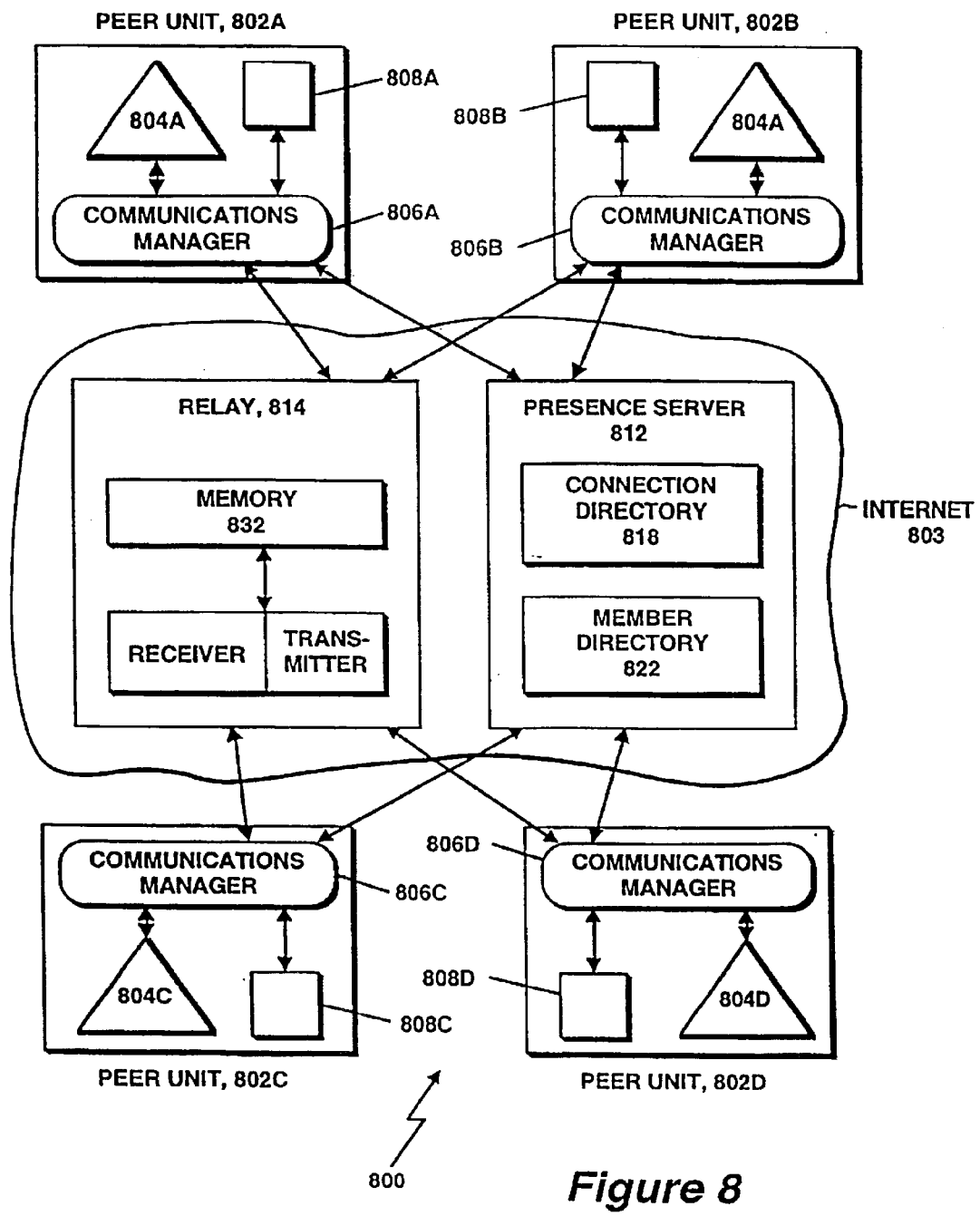
FIG. 8 is a block diagram of an embodiment of portions of the ABC system of FIG. 4 involved in communication between peer units.

FIG. 8 shows an ABC system 800 equipped for communication between a number of peer units 802A–D via a network, e.g., Internet 803. Each peer unit 802A–D can include the components described above with respect to peer unit 314A. (The exact number of peer units shown in FIG. 8 was selected merely for illustrative purposes, and will depend on the configuration of a particular implementation and may vary over time.) Each peer unit 802A–D includes a dynamics manager 804A–D for coordinating processing of deltas as initiated by tools 805A–D and performed by engines 807A–D, and a communications manager 806A–D for controlling communication between the peer units 802A–D. The responsibilities of the communications manager 806A–D include transmitting and receiving messages (including deltas) over the network, e.g., Internet 803 using Internet protocols, such as, for example, TCP/IP. Each peer unit 802A–D includes a memory 808A–D for storing data in support of operation, among other functions, of the communications managers 830A–D, respectively.

As noted, each communications manager 806A–D is responsible for managing all communications between its peer unit and the other peer units. For example, communications manager 822 manages bi-directional communications between peer unit 802A and peer units 802B–D. The communications can include messages sent either from the peer unit 802A to one or more of peer units 802B–D, or from one of the peer units 802B–D to peer unit 802A. The transmissions can be made directly and without intermediaries, provided the destination peer unit(s) 802B–D (in the former case) or peer unit 802A (in the latter case) are connected to the network, e.g., the Internet ("on-line"). As noted above, a device presence server 812 can be employed to ascertain whether the intended destination is on-line, or temporarily disconnected ("off-line"). If the destination is off-line, the communications can be made via a relay 814 (as noted above), which then forwards the message on to its destination when it returns online.

Thus, if peer unit 802A seeks to send a message to peer unit 802C, and the presence server 812 has informed the communications manager 806A that peer unit 802C is on-line, then the communications manager 806A sends the message via the network, e.g., the Internet 803, directly to the URL of peer unit 802C. At peer unit 802C, the message is received by communications manager 806C, which passes the message to dynamics manager 804C.

On the other hand, if peer unit 802A seeks to send a message to peer unit 802C, and the device presence server 812 has informed the communications manager 806A that peer unit 802C is off-line, then the communications manager 806A sends the message via the network, e.g., Internet 803, to the URL of the relay 814. The relay 814 can be implemented as a high-performance file server, which stores the en route message until peer unit 802C returns on-line, and then forwards the message to the URL of peer unit 802C. At peer unit 802C, the message is received as noted before, and passed through communications manager 806C to dynamics manager 804C.

Accordingly, the presence server 812 can serve the purpose within the ABC system 800 of monitoring whether the peer units 802A–D are on-line, and notifying each of the peer units of the connection status of the other peer units. To fulfill this purpose, the presence server 812 can be configured, for example, as shown for computer system 100 of FIG. 1.

During operation, each of the peer units 802A–D can be responsible for notifying the presence server 812 of its connection status, i.e., whether it is on-line or about to go off-line. Alternatively, the presence server 812 can poll the peer units 802A–D from time to time to obtain their connection status. This information is stored in the presence server 812 in a preferably volatile memory 816 in a connection directory 818. The connection directory 818 is initially empty, and remains so until the peer units 802A–D provide the presence server 812 with their connection status, e.g., provide connection status notifications. Then, upon receipt of the status information, the connection directory 818 stores the notifying peer unit's URL and its connection status.

The presence server 812 can also provide a connection-status subscription service for the peer units 802A–D. The presence server 812 will notify each subscribing peer unit 802A–D of the connection status of each other peer unit 802A–D, and of a change in that connection status. The presence server 812 can send the connection status notifications to the subscribing peer units 802A–D either (a) upon request of status change notifications from the peer unit 802A–D "Wishing" to send a message; (b) upon connection of the peer unit to the network, e.g., the Internet 803; (c) from time to time, e.g., upon a change in status of any of the peer units; or (d) a combination of the foregoing. Preferably, all communications are made pursuant to Internet protocols. These protocols can include, among others, those mentioned above.

Each peer unit 802A–D can also subscribe to a membership-status service, and, by so doing, thereafter learn on an on-going basis of the membership of each telespace in which it is a member. To enable this service, the presence server 812 has a member directory 822 maintained in memory 816 for storing records for each member supported by the presence server. Each peer unit provides the presence server with its current membership status from time to time or, alternatively, upon any change it its membership status.

To illustrate, if peer unit 802A wishes to send a message, such as a delta, to peer unit 802B, peer unit 802A accesses the presence server 430 and obtains the URL of peer unit 802B to obtain its connection status. Assuming peer unit 802A subscribes to the subscription service, it will have received notification of the status of peer unit 802B. Thus the dynamics manager 804A will have passed the message to the communications manager 806A without knowledge of whether the destination peer unit 802B is connected to the network.

G. Distributed Data Consistency Model and Delta Processing

As noted above, the dynamics managers 804A–D in the peer units 802A–D are responsible for receiving locally-generated and remotely-generated deltas and maintaining a proper order for their execution by their respective engines 807A–D so as to maintain a high level of consistency of the data models across all the peer units 314A–D of the ABC system 800 participating in a telespace. This is made all the more difficult because deltas originating from one or another of the peer units may be received and/or executed out of order, or even after significant delays due to peer units being temporarily disconnected from the network. Moreover, the deltas may be generated based on different and inconsistent local data states.

Theoretically, data consistency can be described in terms of three properties, each achievable to some degree in collaboration systems, namely causality preservation, intention preservation, and convergence. More specifically, these properties of consistency can be described as follows:

1. Causality preservation (i.e., sequential consistency) requires that, if delta A causes delta B, then delta A must be executed first so that the sequence that gave rise to the creation of the deltas is preserved in their execution. In other words, satisfaction of this property requires that the execution order of dependent operations be the same as their natural cause/effect order.

2. Intention preservation (i.e., semantic consistency) requires that the meaning of the deltas and the intention behind their creation be preserved. In other words, satisfaction of this property requires that, for any pair of deltas, e.g., delta A and delta B, the execution of each must preserve the intention of the other. To achieve this, the system records the data state at the time a user requested a change to that data state. For example, in a shared document, when change "x" was requested, the next word was "y" and the same is true when "x" is executed. Put another way, the effects of executing a delta on the data stored at each peer unit must be the same as the effects of executing the same delta on the data stored at the originating peer unit.

3. Convergence requires that the copies of data maintained by each and every peer unit 802A–D must be identical after executing the same deltas. This is known as "total ordering."

The ABC system 800 records the necessary information to maintain a high level of data consistency and imposes delta execution order constraints on deltas whose execution is dependent on the prior execution of other deltas. For example, where deltas are designated with capital letters A, B, C, D, assigned in the order of delta receipt by the dynamics manager 804A of peer unit 802A, it is possible that the deltas A, B, C, D may be properly executed in that order of receipt to preserve causality. This may even be the case if, e.g., deltas A and C originated locally from peer unit 802A and deltas B and D came from remote peer unit 802D. In some cases, however, execution of those deltas in the order of receipt will result in the changes being made out of order giving rise to a causality violation. This may arise, for example, because of differential latencies in the communication paths traversed by locally-generated and remotely-generated deltas, which can result in the deltas being received in an interleaved fashion. Moreover, even if causality preservation is achieved, the result may violate the intention preservation property, and the changes may even be nonsensical. For example, delta B may seek to insert "four" before "legs" in the sentence "A cow has legs." If delta A sought, without knowledge of delta B's change, to change "legs" to "a head" in that sentence, and is executed before delta B so as to change the context for delta B, the result is "A cow has four a head." Indeed, this result makes no sense, and nor would the result if delta A were processed after delta B. As for convergence, a number of conditions may compromise the "sameness" (i.e., replication) of the copies of the data at the peer units 802A–D. For example, communication faults in the network may prevent deltas from being received by some peer units 802A–D, causing different delta execution results. It is difficult, if not impossible, to achieve total convergence, causality preservation, and intention preservation in a practical system, but a high level of data consistency is desirable for collaboration between the peer units.

In order to achieve a high level of data consistency, each dynamics manager 804A–D preferably creates deltas of a predetermined format, and records in the deltas and in their respective memories certain information used to maintain data consistency. Specifically, each dynamics manager 804A–D assigns to each delta it creates a sequence number ("Seq.No.") to indicate the sequencial position of the delta among all deltas created by that dynamics manager at the particular peer unit 802A–D. The dynamics manager 804A–D then records the assigned sequence number in the delta along with the endpoint identifier ("EP") specifying the endpoint (peer unit and person) that originated the delta. The dynamics manager 804A–D also records in the delta at the time of its creation information specifying a single dependency. The dependency information recorded in the delta is, e.g., in the form of the sequence number and EP of the endpoint originating one other delta, for example, usually, the delta last executed immediately prior to the creation of the subject delta by the engine 807A–D for the same activity as the subject delta and at the originating peer unit for that delta.

Some deltas do not depend on prior deltas, for example, because the state of the telespace data is unimportant to their execution. They are called "independent deltas". For independent deltas, no such dependent sequence number need be provided. Each dynamics manager 804A–D extracts consistency information from the headers of received deltas, and maintains the information along with the rest of the delta information in memory.

Figure 9:
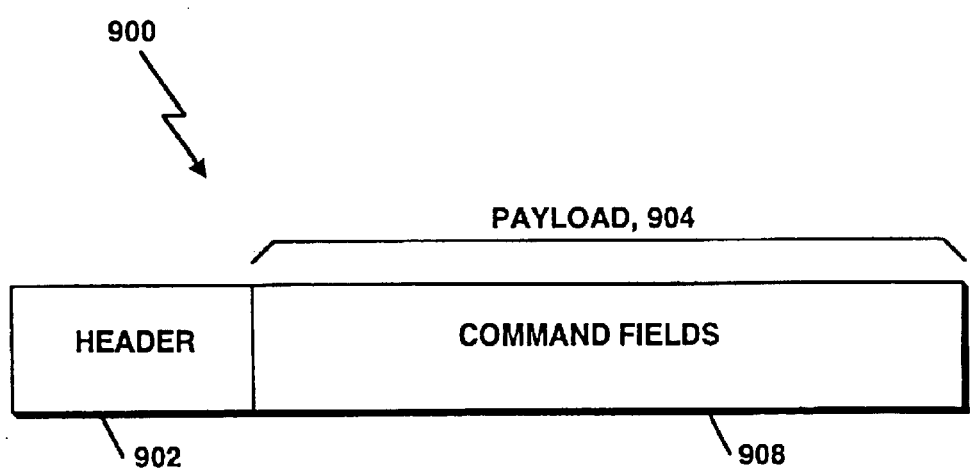
FIG. 9 is an illustration of an exemplary format for a delta for processing by the ABC system of FIG. 4.

FIG. 9 shows a format for a delta 900 in accordance with an embodiment of the invention, which can accommodate the consistency information just described. The delta 900 has a header 902, followed by a payload 904. The header 902 identifies the delta, contains consistency information, and may contain other "housekeeping" information. The payload 902 has one or more command fields 908 for specifying commands recorded in the delta by one of the engines 807A–D.

The header 902 specifies consistency information, for example, as follows:

Seq. No. @ EP No.: Seq. No. @ EP No.

where the initial "Seq.No. @ EP" No. (before the colon) specifies the sequence number of the present delta at a generating peer unit, e.g., at peer unit 314A as identified by its URL; the colon should be read as "depends on"; the second "Seq. No. @ EP" after the colon specifies a dependent sequence number specifying, e.g., the immediately prior delta generated at the same peer unit, e.g., peer unit 314A as identified by its URL, which is referred to as the delta on which the present delta depends.

Figure 10:
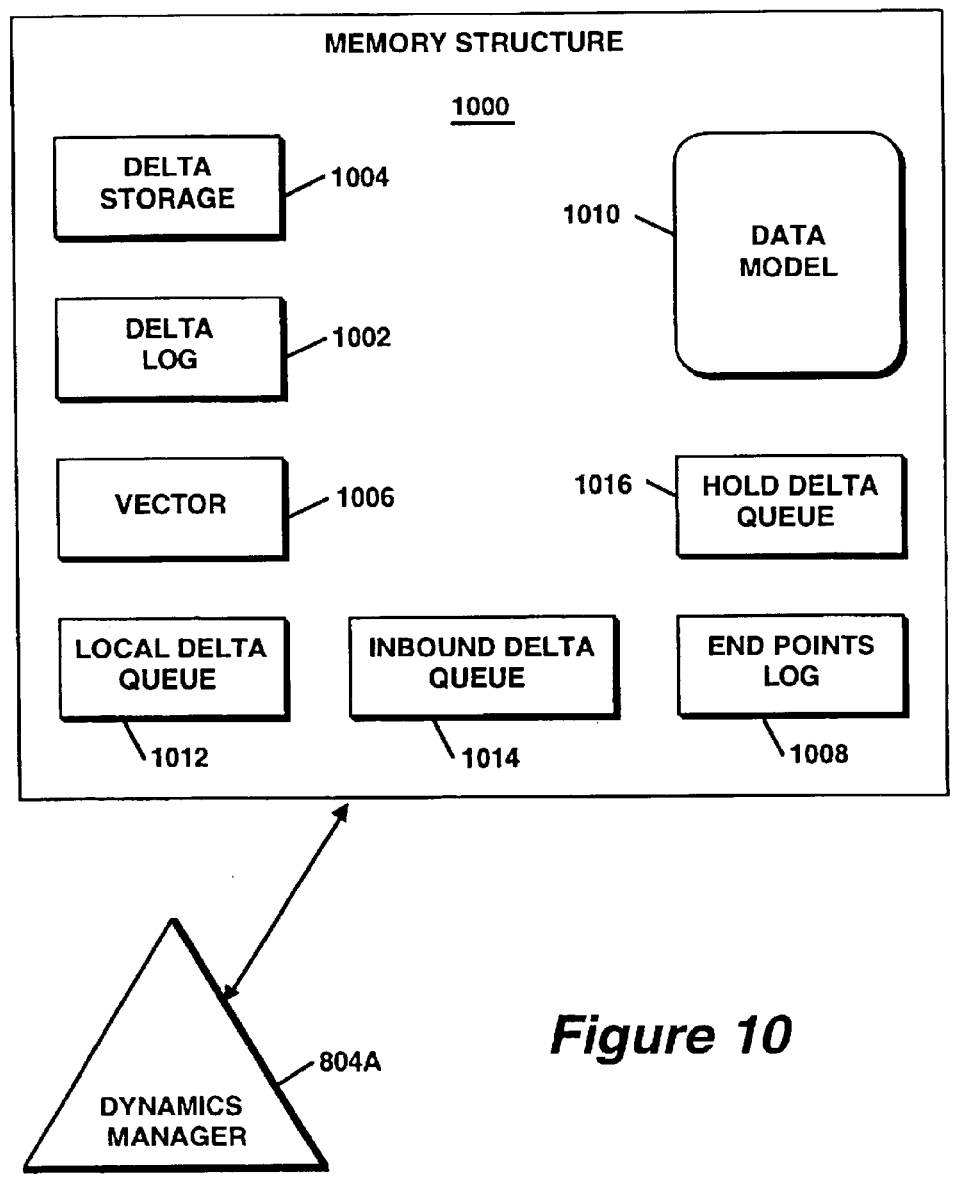
FIG. 10 is a block diagram of a memory structure for supporting delta processing by the ABC system of FIG. 4.

FIG. 10 shows an illustrative memory structure 1000 for storing the information extracted from deltas by, for example, dynamics manager 804A. The dynamics manager 804A persistently maintains the following records: A) a delta log 1002, which is a record of all the deltas executed by it within the telespace, e.g., Delta 1, Delta 2, . . . Delta n, where "n" is the count corresponding to the delta most recently executed by dynamics manager 804A in the telespace; B) a delta storage 1004, which stores the contents of such deltas and, e.g., can be implemented in the delta log 1002; C) a vector 1606, which is an array specifying the highest sequence number of deltas that dynamics manager 804A of peer unit 802A received from each of the other peer units 802B–D of the telespace and the highest sequence number of deltas generated by the dynamics manager 804A itself for the telespace; D) an endpoints (EPs) log 1008, which is a list of endpoints that are members of telespaces of which peer unit 314A is also a member, and provides the endpoint identifier of each; E) a data model space 1010, which provides storage for data, in accordance with an activity-specific, data model, for use in each activity; F) a local delta queue 1012, G) an inbound delta queue 1014, and H) a hold delta queue 1016.

The vector 1006 is important in this regard for storing Information used in maintaining a high level of data consistency, and thus deserves further discussion. The vector 1006 stores, for example, the following consistency information regarding each received delta: (a) an originating endpoint identifier ("UID"), which is an identification of that endpoint that is unique across the telespace; (b) an endpoint-relative sequence number, which is a running count of deltas in the telespace received from each end-point, and corresponds essentially to a per-endpoint time stamp for ordering purposes of the received deltas; (c) a dependent sequence number for the deltas, which indicates, as of the time an endpoint created a delta, it did so based on a certain prior delta in the sequence that had been executed by that peer unit (i.e., the "user seen" current state). In the preferred embodiment, all of this information can be extracted from the received deltas.

During operation, when a delta is received, for example, by the dynamics manager 804A, the dynamics manager places the received delta in either one of the local delta queue 1012 or the inbound delta queue 1014, depending on whether the received delta was locally initiated or remotely initiated. Some implementations can store only a pointer to each such delta in the appropriate queue. The queues 1012, 1014 are implemented, for example, as FIFO (first-in-first-out) workload buffers. (Alternatively, a single queue can be utilized in some implementations for holding both inbound and local deltas.) The dynamics manager 804A processes the deltas from the queues 1012, 1014 on a first in, first out basis. Some implementations can use an appropriate priority algorithm for processing deltas from one or the other of the local or inbound delta queues 1012, 1014, for example, for load balancing and/or latency control. It may be desirable to process all inbound deltas in the inbound queue prior to local deltas in the local queue to constrain average latency in delta processing. Alternatively, the opposite order in which local deltas are processed with priority may avoid long latency in the event of a long inbound delta queue upon reconnection of the peer unit to the network.

Figure 11A:
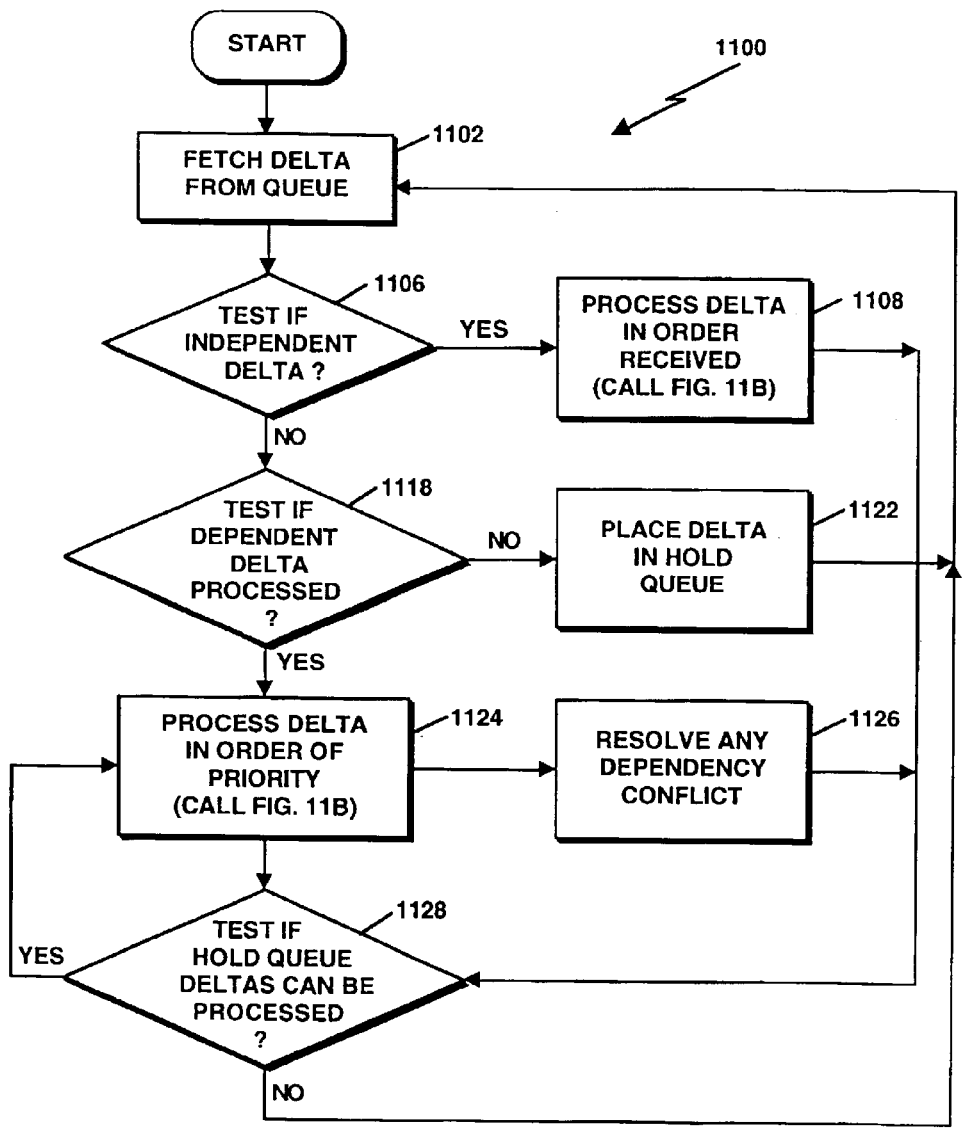
FIGS. 11A and 11B are flow charts depicting a method for delta processing by the ABC system of FIG. 4 in accordance with an embodiment of the invention.

FIG. 11A shows an exemplary implementation of a delta processing method 1100, using the foregoing ordering and data consistency information. In step 1102, the dynamics manager 804A fetches a next or "current" delta from one of the local and inbound delta queues 1012, 1014. In step 1106, the dynamics manager 804A checks the vector 1006, and determines, from the sequence and dependency information, if the current delta is independent and does not have a corresponding dependent sequence number. If so, step 1108 processes the current delta immediately in the order received, by calling or invoking the subroutine 1110 of FIG. 11B. In step 1112 of subroutine 1110, the dynamics manager 804A registers or assimilates the delta in the delta log by storing its UID, sequence number and dependency sequency number in the delta log. Then, step 1114 causes the delta to be executed. Afterwards, step 1116 updates the time stamp vector 1006. For that, the dynamics manager 804A extracts the header information, and updates the endpoint number and the highest sequence number of its peer unit in the vector 1006. Then the subroutine returns to continue delta processing per FIG. 11A at step 1128. If the test of step 1106 determines that the current delta is not independent, in step 1118, the dynamics manager 804A checks for the dependent sequence number (specified in the delta's leader) in the vector 1006, and determines whether the delta on which the current delta depends has been processed. It has been processed if its sequence number is less than that stored in the vector 1006 for the corresponding endpoint. (While theoretically this information could be stored in the delta log, the delta log is preferably purged from time to time to keep its size within practical bounds.) If it has not been processed, in step 1122, the current delta is placed in the hold queue 1016. If the delta on which the current delta depends has already been processed, then the current delta can be processed as will be next described in detail.

Figure 11B:
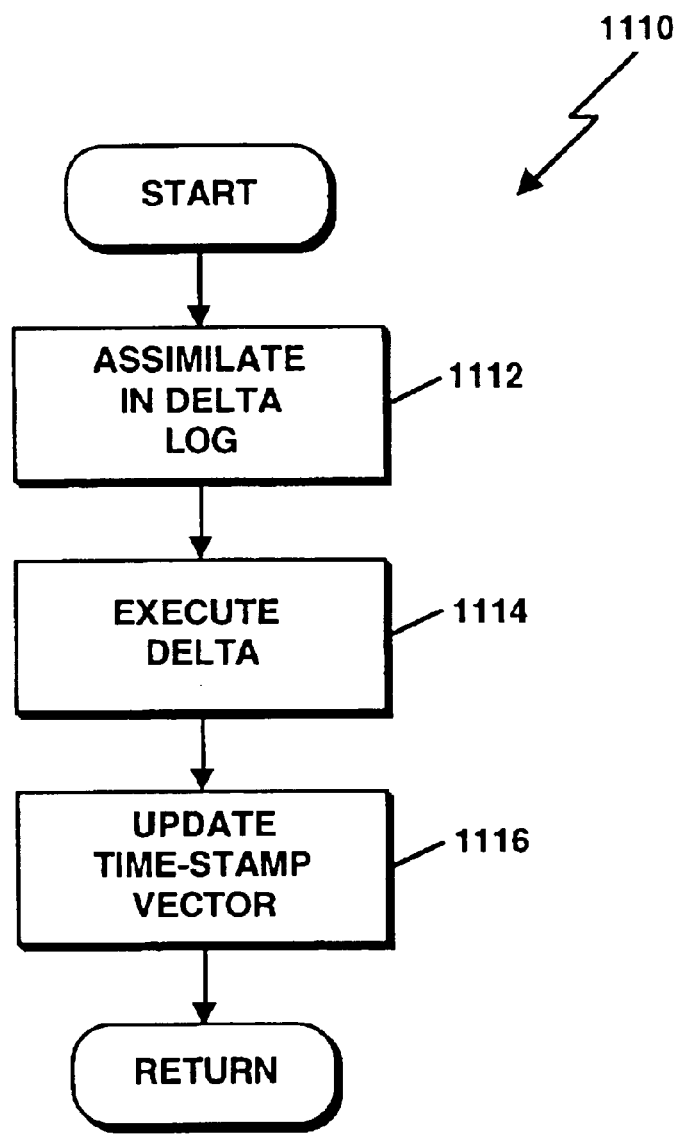

In step 1124, the dynamics manager 804A determines the order of delta processing, and then involves the subroutine 1110 of FIG. 11B, as described above. If the current delta is dependent on a previously executed delta and if no other received delta depends on the same prior delta, as indicated by the delta sequence numbers in the delta log 1002, the current delta is immediately executed without further consistency concerns. On the other hand, if the current delta has the same dependent sequence number, i.e., Seq. No. @ EP as another pending delta registered in the delta log 1002, then a collision condition occurs between those deltas.

In this embodiment, the ordering of execution of deltas in the event of a collision depends on the endpoint that originated the delta, although other implementations can alternatively use other priority schemes or default ordering to resolve collisions. As implemented, each endpoint that is a member of a telespace is assigned (e.g., by the first endpoint member of the telespace) a unique endpoint number, corresponding, for example, to the order in which the endpoint originally joined the telespace. Thus, if peer unit 314A was the first in the telespace, it may be numbered EP1, and successive new members receive numbers according to a hierarchical numbering scheme, for example, reflecting the sponsoring endpoint that invited the new member into the telespace. Thus, if endpoint EP1 invited two new members into the telespace, they may be numbered EP1.1 and EP1.2. Then, if endpoint EP1.1 invited three new members to join, the new members may be numbered EP1.1.1, EP1.1.2, and EP1.1.3. The digits from left to right in the endpoint numbers can be referred to as first order, second order, etc. Thus, in EP1.1.3, the number "one" on the left is the first order, the "one" in the middle digit position is the second order and the "three" is the third order.

The foregoing numbering scheme has special qualities, particularly suited for assigning unique designations to endpoints for use in a peer-to-peer, fully distributed collaboration system, where members can join or discontinue membership at any time or connect or disconnect temporarily from the telespace at any time. As noted, this scheme assigns a unique designation to each endpoint of each of the telespace members. Each designation of a member indicates the order in which the member joined the telespace, and, for each member invited to join (or otherwise sponsored) by another telespace member (the "inviting member"), it also indicates the inviting member. As more and more members are invited to join by those new members, the designations add additional orders of digits to indicate the family tree or chain of inviting members. Accordingly, the designations can be thought of as indicating the ancestry of each member added to a telespace after the founding members of a telespace. Thus, where the designations comprise a number of orders, the first order designates a founding member of the telespace, and each successive order after the first order (e.g., second, third, etc, order) designates a member invited to join the telespace by an inviting member specified by the preceding order digit. The inviting member may be a founding member or another member of the telespace of intermediate seniority and with telespace membership sponsoring privileges. In one embodiment, each inviting member is responsible for assigning telespace numbers to members it sponsors.

Figure 12:
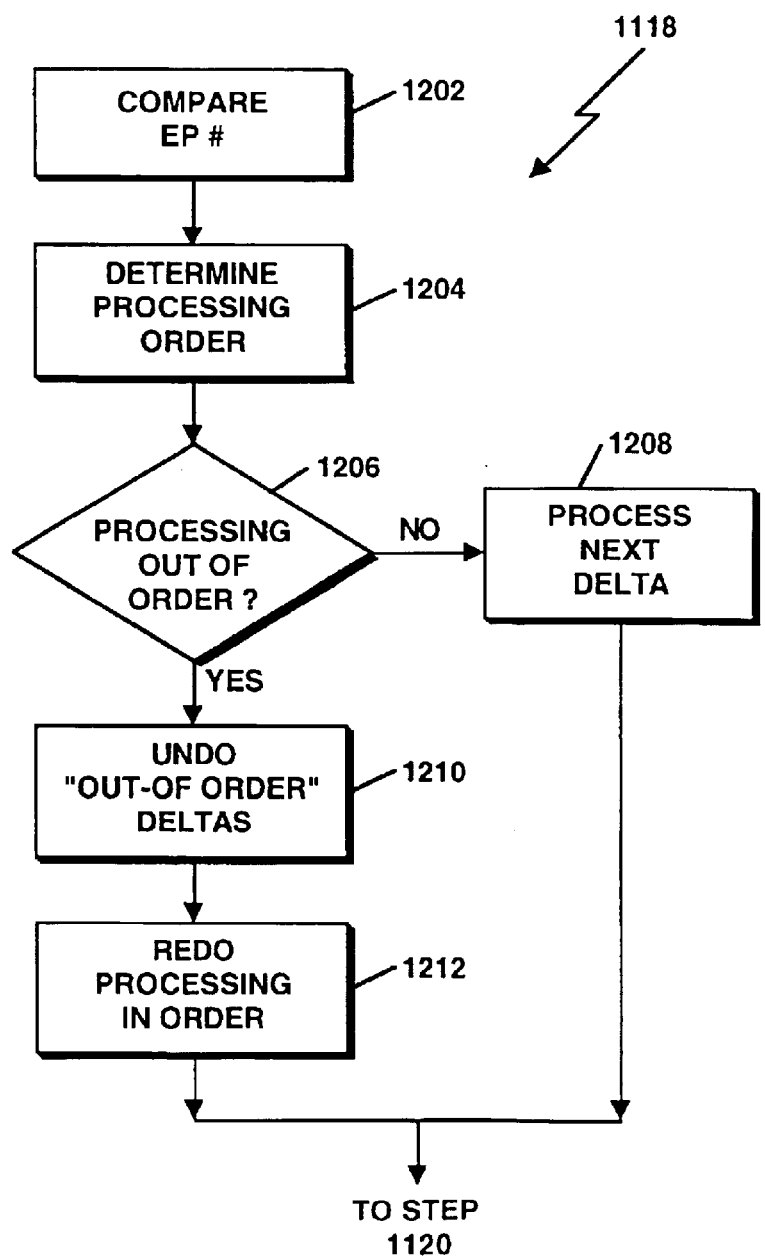
FIG. 12 is a flow chart for resolving dependency conflicts in the method of FIG. 11.

With this numbering scheme, in step 1126 of FIG. 11A, the dynamics manager 804A resolves dependency collisions, maintaining total ordering. As shown in FIG. 12, dependency collision resolution can be performed by step 1202 comparing EP numbers on an order by order basis, and step 1204 determining a processing order based on that comparison so that deltas with the lowest numbers in the lowest orders are scheduled for processing first. Then, step 1206 tests whether any of the deltas have already been processed out of order and ahead of other delta(s) that should have been processed first. If no deltas have been processed out of order, then step 1208 processes the next delta. On the other hand, if any have been processed out of order, step 1210 rolls-back such processing to the data state immediately prior to that delta execution, and then step 1212 "redoes" the processing of the deltas in the proper order.

Thus, this scheme of dependency conflict resolution assures that any endpoint number having, for example, a "one" in the first order will be processed ahead of an endpoint number with a "two", "three" or other higher value in the first order. Where deltas have the same number value in the first order, then the second order digits are compared, etc., until an order is specified, and then that order of delta execution is realized by performing a "do", and, where necessary, "undo" and "redo", operations on the deltas.

For example, the delta log 1002 may for illustrative purposes contain deltas and related information in the form "Seq.No.AA@EP.No.BB:Seq.No.CC@EP.No.DD"

which can be read "sequence number AA at endpoint number BB is dependent on sequence number CC at endpoint number DD". The deltas may be identified as A through C for explanatory purposes herein, and received in alphabetical order according to that designation. The delta log 1002 may appear as follows:

Delta "A"—Seq.No. 1 @ EP1.2:Seq.No.0@EP1
Delta "B"—Seq.No. 2@ EP1.2:Seq.No.1@EP1.2
Delta "C"—Seq.No. 1@ EP1:Seq.No.1@EP1.2

In this example, delta A has a sequence number 1 from endpoint 1.2, which is dependent on sequence number 0 from endpoint 1. Both deltas, B and C are dependent on the same delta from the same endpoint, and that delta is delta A. Delta B was generated at endpoint 1.2, and delta C was generated at endpoint 1. According to the present embodiment, all three deltas are dependent deltas, and are processed in the following order First delta A is processed because it was the first of these deltas to be received, and accordingly, the dynamics manager causes the appropriate engine to perform the data change specified by delta A. Then, delta B (as the next received delta) is processed by causing the appropriate engine to perform the data change specified by delta B. Then the dynamics manager processes delta C and notes that there is a dependency collision with delta B and that delta C has a lower endpoint number (i.e., EP1) than delta B (i.e, EP1.2). Consequently, delta B is "undone", or more specifically, the data change that was made to the stored data is unmade so as to restore or roll-back the data to its state prior to executing that data change. Then, delta C is processed and the data change specified by delta C effected. Finally, delta B is reprocessed and its data change remade. Accordingly, the order of execution of the requested data changes in this example, after roll-back and remaking, is delta A, then delta C, then delta B.

The foregoing example relates to endpoint numbers having first and second order numbers only, though the principles illustrated apply equally well to other endpoint numbers having additional, higher orders, where collision resolution requires comparison of these higher orders, as described above. Accordingly, priority upon dependency collision is assigned in the order of membership sponsorship and then chronology based on membership date as described above.

Alternatively, priority upon dependency collision can be based on endpoint numbering assigned according to characteristics of the endpoint (e.g., job title, work group or department), nature of change requested (e.g., delete paragraph or add chapter), location of change in data (e.g., change document title or change document summary), or other considerations. To illustrate the principle behind each of these bases for awarding priority, deltas from endpoints having, for example, certain characteristics can be processed in cases of collision ahead of those having other characteristics, such as the deltas from a product design team prior to the deltas from a marketing team or vice versa.

Moreover, since roll-back and remaking of data changes (sometimes called UNDOs and REDOs) are expensive in terms of overhead, it may be desirable to provide in some implementations still other forms of prioritization of delta processing. Implementations may provide alternative priority strategies, for example, depending on activity. Some activities can have one type of conflict resolution or basis for awarding priority, while others can have other types, depending, for example, on the significance of data consistency for the particular activity. Real-time activities like chat rooms may avoid roll-back and remaking of changes in order to lower response time, particularly since order of execution may be less important.

Other implementations may execute deltas in delta clusters where they are related in some way, e.g., to changes to a certain part of a document being edited or to a certain type of change, so that they all may be made at about the same time. Furthermore, excessively-delayed deltas that have sequence numbers earlier by a predetermined value than the highest sequence number for the endpoint stored in the vector 1006 can be discarded in some implementations to avoid thrashing due to excessive redo's.

Returning to FIG. 11A, in step 1128, the dynamics manager 304A determines if the hold queue 1016 has any deltas that were not processed previously because they depended on the prior processing of the current delta. If so, the method returns to step 1124 to process such deltas. After all such deltas have been processed by the loop of steps 1124, 1126 and 1128, the method 1100 returns to step 1102.

The foregoing method of processing deltas so as to optimize data consistency is particularly advantageous in implementations, such as that discussed herein, wherein A) peer units may be temporarily disconnected from the network and thus may not receive deltas until after a long delay during which local deltas may be processed out of order; B) endpoints may dynamically join or fall off membership lists; and C) overhead associated with data consistency is minimized and distributed among the peer units.

Yet other endpoint numbering schemes can be employed advantageously in particular embodiments of the invention. For example, a scheme could be implemented that uses a pseudo-random number generator to assign unique telespace member identifiers. Uniqueness can be guaranteed if the random number generator generates adequately random numbers and the seed is fairly unique. For example, using a network adapter's MAC address as a seed for the generator and creating a 32 byte value can quarantee uniqueness not only within the telespace but also within the ABC system.

The ABC system can be multitasking and multithreading in that each tool-engine combination forming an activity can correspond to a separate dynamics manager, and multiple dynamics managers can be provided to accommodate multiple simultaneously operating activities. While a one-to-one relationship between telespaces and dynamics managers may introduce the least latency in handling deltas, thread starvation could give rise to an error or fault condition. On the other hand, single dynamics managers supporting many telespaces could give rise to congestion problems. The optimal numbers of each component will depend on the hardware application, number of participating peer units, and traffic conditions.

The ABC system can comprise plural computer systems (CS), each with one or more telespaces (TS), each instantiating one or more activity components, each activity component having one or more tool (T), engine (E) pairs, each of whose operation is coordinated by a dynamics manager (DM). Thus, the ABC system can have multiple telespaces with one or more dynamics managers. Accordingly, the ABC system can be formed, for example, as follows:

ABC system=

$$CS_1 = DM_1 + A_1, \text{ where } A_1 = T_1 + E_1$$

$$CS_2 = DM_2 + A_2, \text{ where } A_2 = T_2 + E_2$$

. . .

. . .

$$CS_n = DM_n + A_n, \text{ where } A_n = T_n + E_n$$

where all the activities $A_1$ $A_2$ and $A_n$ reside in one or more telespaces, and "n" is a positive integer. Thus, by way of illustration, the following are examples of various telespace instantiations:

$$TS \subset A_1, \text{ or}$$

$$TS \subset A_1 + A_2 \text{ or}$$

$$TS \subset A_1 + A_2 \ldots A_m.$$

or $$TS \subset A_1$$

$$TS_2 \subset A_2$$

and $$TS_m \subset A_m$$

where the symbol "=" means "a set comprising", and "m" is a positive integer. Accordingly, each telespace can instantiate of one or more activities, and the framework can have a single telespace; alternatively, each telespace can instantiate of one or more activities, and the framework can have multiple telespaces.

A software implementation of components of the above-described embodiment may comprise computer instructions and routines either fixed on a tangible medium, such as a computer-readable media, e.g. the diskette 142, CD-ROM 147, ROM 115, or fixed disk 152 of FIG. 1, or transmittable via a modem or other interface device, such as communications adapter 190 connected to the network 195 over a medium 191. Medium 191 can be either a tangible medium, including but not limited to optical or hard-wire communications lines, or may be implemented with wireless techniques, including but not limited to microwave, infrared or other transmission techniques. It may also be the Internet. A series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system PROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. It will be obvious to those skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Further, aspects such as the size of memory, the specific configuration of logic and/or instructions utilized to achieve a particular function, as well as other modifications to the inventive concept are intended to be covered by the appended claims.

What is claimed is:

1. A local network-capable device adapted for collaborative operation and communication over a network with at least one remote network-capable device to enable the local network-capable device and the remote network-capable device to cooperatively edit the same data, each of said local network-capable and remote network capable devices comprising:
    A) a memory for storing a local copy of the data in accordance with a data model;
    B) a data-change engine coupled with the memory, and responsive to a plurality of data change requests that have an absolute order relative to each other, for controlling storage of the local copy of data in the memory in accordance with the data model and making changes to the local copy of the data; the data change requests including a locally-generated data change request and a remotely-generated data change request; and
    C) a dynamics manager, coupled with the data-change engine, and responsive to the data change requests for controlling the engine and coordinating execution of the data change requests; wherein the dynamics manager, responsive to the data change requests, can cause the making of received data changes in the absolute order, and, responsive to a data change request being received out of the absolute order, the undoing of the selected data changes to a point where a data change corresponding to the out-of-order data change request should have been made, the making the out-of-order change and the remaking of the undone data changes in the absolute order so that the same data changes are made in the same order to the local copies of the data stored in both the local network-capable device and the remote network-capable device.

2. The local network-capable device in accordance with claim 1, wherein the dynamics manager causes making, undoing and remaking of data changes in response to a data change request priority scheme.

3. The local network-capable device in accordance with claim 1, wherein the data change request priority scheme includes encoding the data change requests with request sequence numbers that define an absolute order of data change requests relative to each other, and the dynamics manager is responsive to the request sequence numbers in determining an order for making data changes specified by the data change requests.

4. The local network-capable device in accordance with claim 3, wherein the data change request priority scheme includes encoding the data change requests with an identifier corresponding to a characteristic of the network-capable device that generated the request, and the dynamics manager is responsive to the identifier in causing making of data changes.

5. The local network-capable device in accordance with claim 4, wherein each network capable device and a user thereof corresponds to an endpoint, and the identifier comprises an endpoint number corresponding to the endpoint that originated the data change request.

6. The local network-capable device in accordance with claim 5, wherein the request sequence numbers comprise endpoint relative sequence numbers, and the dynamics manager causes the data change requests to be processed in an order dependent on the endpoint relative sequence numbers and the endpoint numbers.

7. The local network-capable device in accordance with claim 3, wherein the data change request priority scheme includes a dependency identifier in each data change request, and the dynamics manager is responsive to the dependency identifier in causing undoing and remaking of data changes.

8. The local network-capable device in accordance with claim 7, wherein the dependency identifier specifies at least one data change request on which the encoded data change request depends.

9. The local network-capable device in accordance with claim 8, wherein the dependency identifier specifies one data change request on which encoded data change request depends.

10. The local network-capable device in accordance with claim 8, wherein the dynamics manager executes do, undo and redo operations with respect to data change requests to ensure that each one of the data change requests is processed only after the specified data change request on which the one data change request depends has been processed.

11. The local network-capable device in accordance with claim 8, wherein
    A) the request sequence numbers comprise endpoint relative sequence numbers;
    B) the dynamics manager causes the data change requests to be processed in an order dependent on the endpoint relative sequence numbers and the endpoint numbers; and
    C) the dynamics manager causes data changes to be undone and remade responsive to the dependency identifier.

12. A distributed, coordinated system for maintaining plural copies of the same data pursuant to a distributed data model, wherein the copies can be changed responsive to users' actions, the system comprising:
    A) a plurality of computer systems, each of the computer systems capable of locally generating a plurality of data change requests that have an absolute order relative to each other for changing a local copy of the data and of executing data change requests including the locally-generated data change requests and remotely-generated data change requests generated by others of the computer systems so as to make the requested changes to the local copy of the data;

B) each of the computer systems including a dynamics manager that receives locally-generated data change requests and remotely-generated data change requests for determining, responsive to information contained in the locally-generated and remotely-generated data change requests, the absolute order in which requested changes must be made to the local copy of the data, for making requested data changes in the determined order, for undoing data changes made when a remotely-generated data change request is received out of the determined order to the point where a data change corresponding to the out-of-order data change request can be made in the determined order and for remaking undone data changes in the absolute order.

13. The system in accordance with claim 12, wherein the dynamics manager of each computer system is responsive to data dependency information and request sequence information recorded in the data change requests in determining the absolute order in which the requested changes must be made to the local copy of the data; the data dependency information comprising an indication of at least one prior data change request on which the data change request depends; and the request sequence information indicating a sequential position of the data change request among a plurality of data change requests generated by the computer system that generated the data change request.

14. A framework apparatus for providing communication services for an activity-based collaboration system in which data change requests comprising deltas are communicated over a network between network-capable devices in order to maintain consistency between local data copies, each delta containing dependency information that absolutely orders that delta relative to all other deltas, the framework apparatus comprising a communications manager operable on a local network capable device for sending locally-generated deltas over a network to at least one remote network-capable devices and for receiving remotely-generated deltas from the at least one remote network-capable device; and a dynamics manager responsive to the dependency information contained in the deltas for determining an order for processing the deltas to make changes to each local data copy, the dynamics manager being responsive to the reception of a remotely-generated delta out of the determined order for causing the selective undoing of changes made to a local data copy, the making of a data change corresponding to the out-of-order delta and the selective remaking of the undone data changes in the determined order.

15. A method for providing communication services for an activity-based collaboration system, in which data change requests comprising deltas are communicated over a network between network-capable devices in order to maintain consistency between local data copies, each delta containing sequence information that absolutely orders that delta relative to all other deltas, the method comprising the steps of:

A) sending locally-generated deltas from a local network-capable device over a network to at least one remote network-capable devices and for receiving remotely-generated deltas from the at least one remote network capable device;

B) determining an absolute order for processing the deltas based on sequence information contained within the deltas;

C) processing the deltas in the determined order thereby making changes to a local data copy as requested by the deltas;

D) undoing requested changes made to the local data copy in response to sequence information contained within the deltas indicating that a remotely-generated delta has been received out of the determined order;

E) making a data change to the local data copy corresponding to the out-of-order delta; and F) remaking the undone data changes in the determined order.

16. A method for processing data change requests in a network-capable device having a local data copy and data change means for generating data change requests, each data change request containing information that absolutely orders that data chance request relative to all other data change requests, and specifying a change to be made to the local data copy, wherein the network-capable device communicates over a network with at least two other network-capable devices to enable all network-capable devices to cooperatively edit the same data during an editing session, the method comprising:

(a) when a first and second received data change requests require that a third data change have previously been made to the local data copy, determining the absolute order of making the data changes as specified by the first and second data change requests based on information contained in the data change requests;

(b) when a change specified by one of the first and second data change requests cannot be made in the order determined by the data change requests because other changes have already been made to the local data copy, undoing the other changes to the local data copy;

(c) making a change to the local data copy as specified by the one data change request; and (d) redoing data changes undone in step (b) so that data changes are made to the local data copy consistently with changes made to local data copies in all network-capable devices.

17. The method of claim 16 wherein step (a) comprises:

(a1) when a first and second received data change requests require that a third data change have previously been made to the local data copy and the third change has not been made, placing the first and second received data change requests in a holding queue for subsequent processing.

18. The method of claim 17 wherein step (b) comprises:

(b1) when the changes specified by the first and second data change requests can be made in the order determined by the data change requests making the data changes specified by the data change requests in the determined order.

19. The method of claim 18 further comprising:

(e) determining whether changes to the local data copy specified by data change requests in the holding queue can be made.

20. The method of claim 19 wherein the information in the data change requests comprises an order in which each of the network-capable devices joined the editing session.

21. The method of claim 16 wherein the information in the data change requests further comprises a sequence number for each network-capable device.

22. The method of claim 16 further comprising:

(e) placing information for each change made to the local data copy in a data change log; and (f) using the information in the data change log to undo changes to the local data copy.

23. The method of claim 22 further comprising:

(g) after each data change has been made, updating a timestamp vector comprising a data change sequence number for each endpoint.

24. The method of claim 23 wherein step (a) comprises:

(a2) when a first and second received data change requests require that a third data change have previously been made to the local data copy, using the timestamp vector to determine whether the third change has been made.

25. Apparatus for processing data change requests in a network-capable device having a local data copy and data change means for generating data change requests, each data change request containing information that absolutely orders that data change request relative to all other data change requests, and specifying a change to be made to the local data copy, wherein the network-capable device communicates over a network with at least two other network-capable devices to enable all network-capable devices to cooperatively edit the same data during an editing session, the apparatus comprising:

when a first and second received data change requests require that a third data change have previously been made to the local data copy, means for determining the absolute order of making the data changes as specified by the first and second data change requests based on information contained in the data change requests;

when a change specified by one of the first and second data change requests cannot be made in the order determined by the data change requests because other changes have already been made to the local data copy, means for undoing the other changes to the local data copy;

means for making a change to the local data copy as specified by the one data change request; and means for redoing undone data changes so that data changes are made to the local data copy consistently with changes made to local data copies in all network-capable devices.

26. The apparatus of claim 25 wherein the means for determining an order of making the data changes comprises:

a holding queue; and means operable when a first and second received data change requests require that a third data change have previously been made to the local data copy and the third change has not been made, for placing the first and second received data change requests in the holding queue for subsequent processing.

27. The apparatus of claim 26 further comprising means operable when the changes specified by the first and second data change requests can be made in the order determined by the data change requests for making the data changes specified by the data change requests in the determined order.

28. The apparatus of claim 27 further comprising means for determining whether changes to the local data copy specified by data change requests in the holding queue can be made.

29. The apparatus of claim 28 wherein the information in the data change requests comprises an order in which each of the network-capable devices joined the editing session.

30. The apparatus of claim 25 wherein the information in the data change requests further comprises a sequence number for each network-capable device.

31. The apparatus of claim 25 further comprising:

means for placing information for each change made to the local data copy in a data change log; and mean for using the information in the data change log to undo changes to the local data copy.

32. The apparatus of claim 31 further comprising means operable after each data change has been made for updating a timestamp vector comprising a data change sequence number for each endpoint.

33. The apparatus of claim 32 wherein the means for determining an order of making the data changes comprises means operable when a first and second received data change requests require that a third data change have previously been made to the local data copy for using the timestamp vector to determine whether the third change has been made.

* * * * *